(12) United States Patent
Fabrega Sanchez et al.

(10) Patent No.: US 12,206,167 B2
(45) Date of Patent: Jan. 21, 2025

(54) mmW ANTENNA ARRAY WITH RADAR SENSORS

(71) Applicant: QUALCOMM Incorporated, San Diego, CA (US)

(72) Inventors: Jorge Fabrega Sanchez, San Diego, CA (US); Mohammad Ali Tassoudji, San Diego, CA (US); Udara Fernando, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 647 days.

(21) Appl. No.: 17/485,388

(22) Filed: Sep. 25, 2021

(65) Prior Publication Data

US 2023/0099378 A1    Mar. 30, 2023

(51) Int. Cl.
| | |
|---|---|
| *H01Q 13/10* | (2006.01) |
| *G01S 13/04* | (2006.01) |
| *G01S 13/88* | (2006.01) |
| *H01Q 9/04* | (2006.01) |
| *H01Q 21/08* | (2006.01) |

(52) U.S. Cl.
CPC ............ *H01Q 13/10* (2013.01); *G01S 13/04* (2013.01); *G01S 13/88* (2013.01); *H01Q 9/0407* (2013.01); *H01Q 21/08* (2013.01)

(58) Field of Classification Search
CPC ...... H01Q 13/10; H01Q 9/0407; H01Q 21/08; H01Q 21/30; G01S 13/88
See application file for complete search history.

(56) References Cited

U.S. PATENT DOCUMENTS

| | | | | |
|---|---|---|---|---|
| 4,864,314 A | * | 9/1989 | Bond .................. | H01Q 5/42 343/897 |
| 4,870,426 A | * | 9/1989 | Lamberty ............ | H01Q 5/42 343/786 |
| 5,153,600 A | * | 10/1992 | Metzler ............... | H01Q 5/40 343/846 |

(Continued)

FOREIGN PATENT DOCUMENTS

| | | |
|---|---|---|
| CN | 102394379 A | 3/2012 |
| WO | 2021033447 A1 | 2/2021 |

OTHER PUBLICATIONS

International Search Report and Written Opinion—PCT/US2022/075930—ISA/EPO—Dec. 13, 2022.

*Primary Examiner* — Peter M Bythrow
(74) *Attorney, Agent, or Firm* — Polsinelli/Qualcomm Incorporated

(57) ABSTRACT

Aspects described herein include methods and devices for radar integration with a mmW communication module. In some aspects, an apparatus is provided that includes a millimeter wave (mmW) printed circuit board (PCB), with first and second mmW elements, and a radar antenna. The first mmW element is coupled to a first side of the mmW PCB, where the first mmW element is configured for wireless mmW communications at frequencies above approximately 24 gigahertz (GHz). A second mmW element coupled to the first side of the mmW PCB, where the second mmW element is positioned adjacent to the first mmW element and is separated from the first mmW element by a gap spacing. A radar antenna is disposed in the mmW PCB and aligned with the gap spacing between the first mmW element and the second mmW element.

30 Claims, 15 Drawing Sheets

(56) References Cited

U.S. PATENT DOCUMENTS

| | | | | |
|---|---|---|---|---|
| 5,262,791 A * | 11/1993 | Tsuda | ............... | H01Q 5/42 |
| | | | | 343/770 |
| 5,400,042 A * | 3/1995 | Tulintseff | ............... | H01Q 5/42 |
| | | | | 343/793 |
| 5,534,877 A * | 7/1996 | Sorbello | ............... | H01Q 5/42 |
| | | | | 343/700 MS |
| 5,831,581 A * | 11/1998 | Keough | ............... | H01Q 21/065 |
| | | | | 343/729 |
| 6,028,562 A * | 2/2000 | Guler | ............... | H01Q 21/005 |
| | | | | 343/770 |
| 6,091,365 A * | 7/2000 | Derneryd | ............... | H01Q 5/42 |
| | | | | 343/700 MS |
| 6,121,931 A * | 9/2000 | Levi | ............... | H01Q 5/42 |
| | | | | 343/846 |
| 6,208,299 B1 * | 3/2001 | Lindmark | ............... | H01Q 21/30 |
| | | | | 343/700 MS |
| 6,313,807 B1 * | 11/2001 | Kolak | ............... | H01Q 3/24 |
| | | | | 343/771 |
| 6,795,020 B2 * | 9/2004 | Sreenivas | ............... | H01Q 1/38 |
| | | | | 343/893 |
| 7,817,096 B2 * | 10/2010 | Linehan | ............... | H01Q 1/246 |
| | | | | 343/757 |
| 8,558,746 B2 * | 10/2013 | Thomson | ............... | H01Q 21/0075 |
| | | | | 343/770 |
| 2011/0316734 A1 * | 12/2011 | Svensson | ............... | H01Q 9/16 |
| | | | | 342/175 |
| 2017/0062952 A1 * | 3/2017 | Sundararajan | ............... | H01Q 1/246 |
| 2017/0141471 A1 | 5/2017 | Taachouche et al. | | |
| 2018/0226727 A1 * | 8/2018 | Sato | ............... | H01Q 21/28 |
| 2018/0277962 A1 * | 9/2018 | Kamo | ............... | H01P 1/211 |
| 2019/0267710 A1 * | 8/2019 | Jenwatanavet | ............... | H01Q 21/065 |
| 2020/0028260 A1 * | 1/2020 | Achour | ............... | G01S 13/426 |
| 2020/0144733 A1 * | 5/2020 | Chakraborty | ............... | H01Q 1/2283 |
| 2022/0271435 A1 * | 8/2022 | Hao | ............... | H01Q 21/0031 |

\* cited by examiner

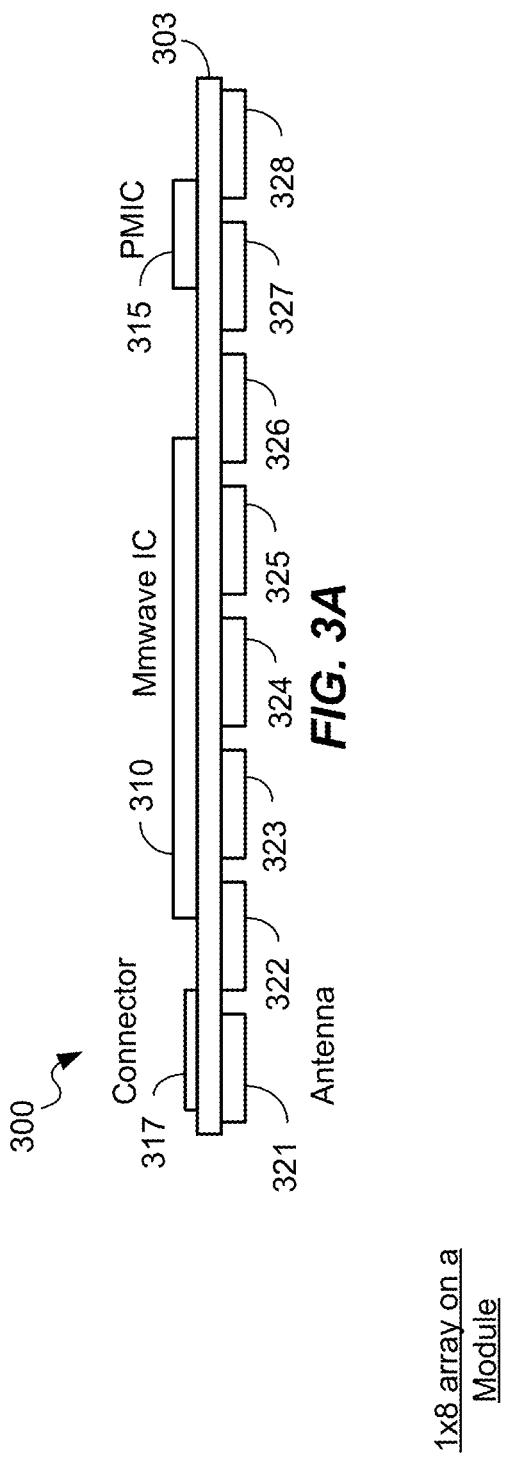
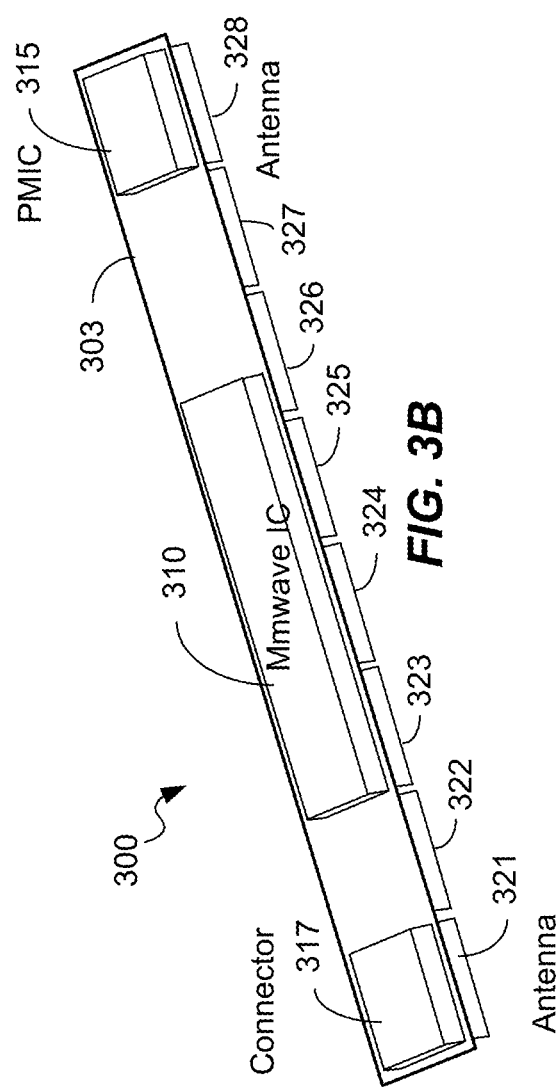
1x8 array on a Module

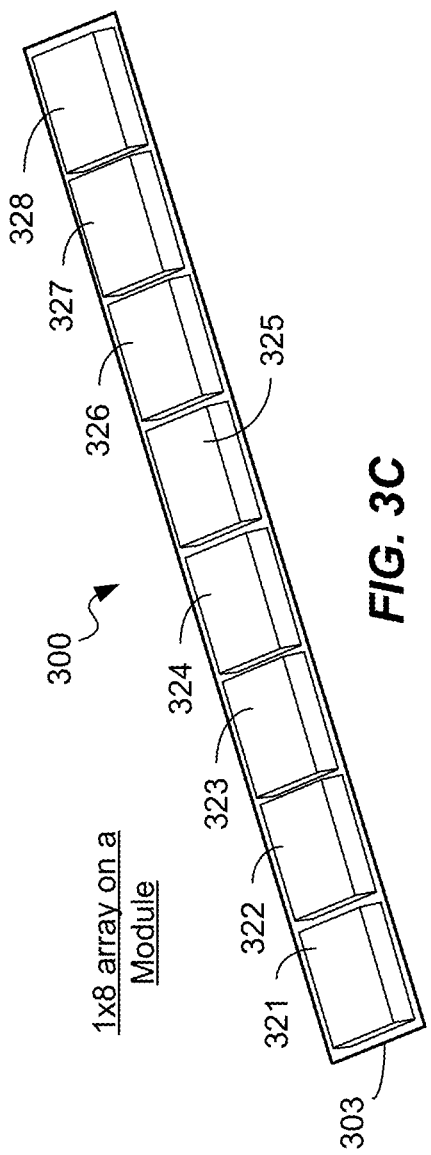
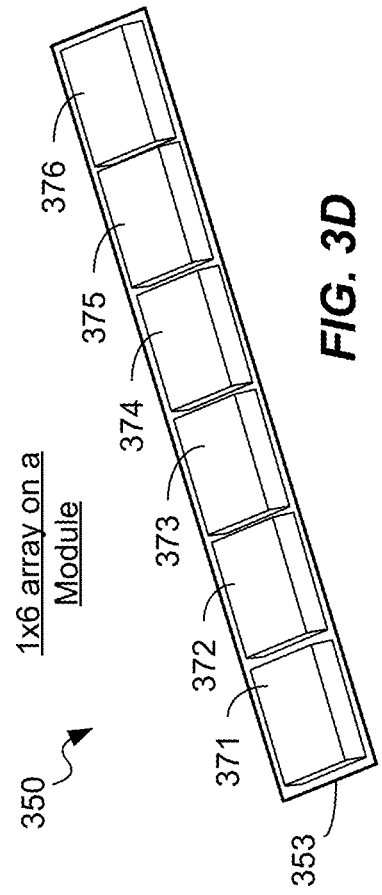

# mmW ANTENNA ARRAY WITH RADAR SENSORS

FIELD

The present disclosure relates generally to electronics and wireless communications. For example, aspects of the present disclosure relate to radar sensors and a millimeter wave (mmW) antenna array.

BACKGROUND

Wireless communication devices and technologies are becoming ever more prevalent. Wireless communication devices generally transmit and receive communication signals. A communication signal is typically processed by a variety of different components and circuits. In some modern communication systems, many different wavelengths of electromagnetic waves can be used in a single device. Supporting different wavelengths for wireless communications can involve managing complex interactions among device elements while managing interactions and interference between elements supporting communications on the different wavelengths.

SUMMARY

Various implementations of systems, methods and devices within the scope of the appended claims each have several aspects, no single one of which is solely responsible for the desirable attributes described herein. Without limiting the scope of the appended claims, some prominent features are described herein.

In some aspects, antenna arrays (which may be included in a module) are described here that support millimeter wavelength (mmW) communications and radar. mmW communications are part of fifth generation communications systems, which use electromagnetic waves between approximately 20 gigahertz (GHz) and 300 GHz. Such frequencies can also be used for radar. Supporting technologies for such frequencies are used in mmW modules for communications. Examples described herein leverage existing structures for mmW communications with integrated radar antennas in existing mmW modules, to improve the functionality of mmW modules. Such functionality can include, for example, basic position sensing associated with radar, RF exposure monitoring associated with mmW communications, among other functionality. For instance, in some examples, regulatory limits are placed on exposure of sensitive objects (e.g., people or other objects proximate to the wireless communication apparatus or mmW module) to electromagnetic radiation. Integration of radar into a mmW module can be used to detect when the mmW module is proximate to a sensitive object, and to monitor power levels used by the mmW module when the sensitive object is near the mmW module (e.g., when exposure is the highest).

MMW modules may include arrays of antennas in a linear configuration, with mmW elements along the linear configuration mounted in a mmW module printed circuit board (PCB). Some modules include gaps between the mmW elements, either between the mmW elements as mounted on a mmW PCB (e.g, a primary module PCB), or between discreet antenna element PCBs used for the different mmW elements (e.g., separate antenna PCBs mounted to the mmW PCB) that make up the array of antennas and other supporting elements mounted to the mmW PCB. In aspects described herein, mmW modules are configured with radar antennas in the gaps between such mmW elements in a mmW module or at ends or edges of a mmW PCB.

In some aspects, wireless communication apparatus is provided comprising: a millimeter wave (mmW) printed circuit board (PCB); a first mmW element coupled to a first side of the mmW PCB, wherein the first mmW element is configured for wireless mmW communications at frequencies above approximately 24 gigahertz (GHz); a second mmW element coupled to the first side of the mmW PCB, wherein the second mmW element is positioned adjacent to the first mmW element and is separated from the first mmW element by a gap spacing; and a radar antenna disposed in the mmW PCB and aligned with the gap spacing between the first mmW element and the second mmW element.

In some aspects, the radar antenna comprises a slot antenna configured for frequency modulated continuous wave (FMCW) radar operation.

In some aspects, the slot antenna comprises an hourglass-shaped slot disposed in a first metal layer of the mmW PCB, and an antenna stub positioned along a center portion of the hourglass-shaped slot.

In some aspects, the slot antenna further comprises a stripline feed coupled to a center portion of the antenna stub, wherein the stripline feed is configured to provide a radar signal to the antenna stub and the hourglass-shaped slot or to receive a reflected radar signal from the antenna stub and the hourglass-shaped slot.

In some aspects, the first mmW element and the second mmW element are implemented in the mmW PCB; and wherein the gap spacing is a gap of approximately 1 millimeter (mm) between the first mmW element and the second mmW element.

In some aspects, the wireless communication apparatus further comprises a third mmW element coupled to the first side of the mmW PCB, wherein the third mmW element is configured for wireless mmW communications at frequencies above approximately 24 gigahertz (GHz); a fourth mmW element coupled to the first side of the mmW PCB, wherein the fourth mmW element is positioned adjacent to the third mmW element separated from the third mmW element by a second gap spacing; and a second radar antenna disposed in the mmW PCB and aligned with the second gap spacing between the third mmW element and the fourth mmW element.

In some aspects, the radar antenna is coupled to radar control circuitry via a first stripline configured to provide a radar signal to the radar antenna; and wherein the second radar antenna is coupled to the radar control circuitry via a second stripline configured to receive reflections of the radar signal from the radar antenna.

In some aspects, the radar antenna is coupled to radar control circuitry via a first stripline configured to provide a radar signal to the radar antenna and to receive reflections of the radar signal from the radar antenna.

In some aspects, the radar antenna and the second radar antenna are oriented in mutually orthogonal orientations.

In some aspects, the radar antenna is aligned along a gap associated with the gap spacing; and the second radar antenna is aligned across a second gap associated with the second gap spacing.

In some aspects, the radar antenna is positioned diagonally across a gap associated with the gap spacing; wherein the second radar antenna is positioned diagonally across a second gap associated with the second gap spacing.

In some aspects, the radar antenna is positioned along a gap length associated with the gap spacing between the first mmW element and the second mmW element.

In some aspects, the radar antenna is configured for operation at frequencies between approximately 57 GHz and 71 GHz.

In some aspects, the radar antenna is configured for operation at frequencies of approximately 26 GHz.

In some aspects, the first mmW element comprises a mmW antenna configured to transmit or receive the wireless mmW communications.

In some aspects, the mmW antenna is configured to avoid interference with the radar antenna.

In some aspects, the wireless communication apparatus of claim 1, further comprises a display screen; and control circuitry coupled to the display screen, the first mmW element, and the radar antenna.

In some aspects, the first mmW element is implemented in a first antenna element PCB coupled to the first side of the mmW PCB; wherein the second mmW element is implemented in a second antenna element PCB coupled to the first side of the mmW PCB, the second antenna element PCB being separated from the first antenna element PCB by a substrate gap.

In some aspects, the substrate gap is approximately 0.4 millimeters, and wherein the gap spacing is approximately 1.1 mm.

In some aspects, the first antenna element PCB or the second antenna element PCB cover at least a portion of the radar antenna at the first side in the gap spacing.

In some aspects, a method of operating a wireless communication apparatus is provided comprising: communicating a first data signal using a first millimeter wave (mmW) element coupled to a first side of a mmW module PCB, wherein the first data signal is transmitted or received at frequencies above approximately 24 gigahertz (GHz); transmitting a first radar signal using a radar antenna disposed in the mmW module PCB at a first surface, wherein the radar antenna is positioned in a gap between a first mmW element and a second mmW element that is positioned adjacent to the first mmW element on the first surface of the mmW module PCB; receiving a reflection of the first radar signal; and processing the reflection of the first radar signal to detect one or more objects proximate to the wireless communication apparatus.

In some aspects, the method further comprises: determining a signal power associated with the first data signal over a time period; monitoring the reflection of the first radar signal over the time period; and estimating an electromagnetic power exposure for the one or more objects over the time period using the signal power and the reflection of the first radar signal over the time period.

In some aspects, the method further comprises: processing the reflection of the first radar signal to determine a human vital sign measurement.

In some aspects, the radar antenna is configured for operation at frequencies between approximately 57 GHz and 71 GHz.

In some aspects, the radar antenna is configured for operation at frequencies of approximately 26 GHz.

In some aspects, a wireless communication apparatus is provided comprising: means for communicating a first data signal using a first millimeter wave (mmW) element coupled to a first side of a mmW module PCB, wherein the first data signal is transmitted or received at frequencies above approximately 24 gigahertz (GHz); means for transmitting a first radar signal using a radar antenna disposed in the mmW module PCB at a first surface, wherein the radar antenna is positioned in a gap between a first mmW element and a second mmW element that is positioned adjacent to the first mmW element on the first surface of the mmW module PCB; means for receiving a reflection of the first radar signal; and means for processing the reflection of the first radar signal to detect one or more objects proximate to the wireless communication apparatus.

In some aspects, the wireless communication apparatus further comprises second means for receiving the reflection of the first radar signal oriented in different position on a substrate of the wireless communication apparatus than the means for receiving the reflection.

In some aspects, a wireless communication apparatus is provided, comprising: a millimeter wave (mmW) substrate; a first mmW element coupled to the mmW substrate, wherein the first mmW element is configured for wireless mmW communications at frequencies above approximately 24 gigahertz (GHz); and a slot antenna comprising a slot disposed in a metal layer of the mmW PCB, the slot positioned adjacent to an element boundary for the first mmW element, where the element boundary is defined by metal layers of the first mmW element.

In some aspects, the slot antenna is positioned between the element boundary and an edge of the mmW substrate.

In some aspects, the slot antenna is positioned between the element boundary and an element boundary for a second mmW element coupled to the mmW substrate at a position adjacent to the first mmW element, wherein the element boundary for each element is determined by an extent of associated patches and parasitics for each element.

In some aspects, the apparatuses described above can include a mobile device with a camera for capturing one or more pictures. In some aspects, the apparatuses described above can include a display screen for displaying one or more pictures. In some aspects, additional wireless communication circuitry. The summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and embodiments, will become more apparent upon referring to the following specification, claims, and accompanying drawings.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 3A, FIG. 3B, FIG. 3C, and FIG. 3D are block diagrams illustrating a mmW module in accordance with aspects of the disclosure.

DETAILED DESCRIPTION

Figure 1:
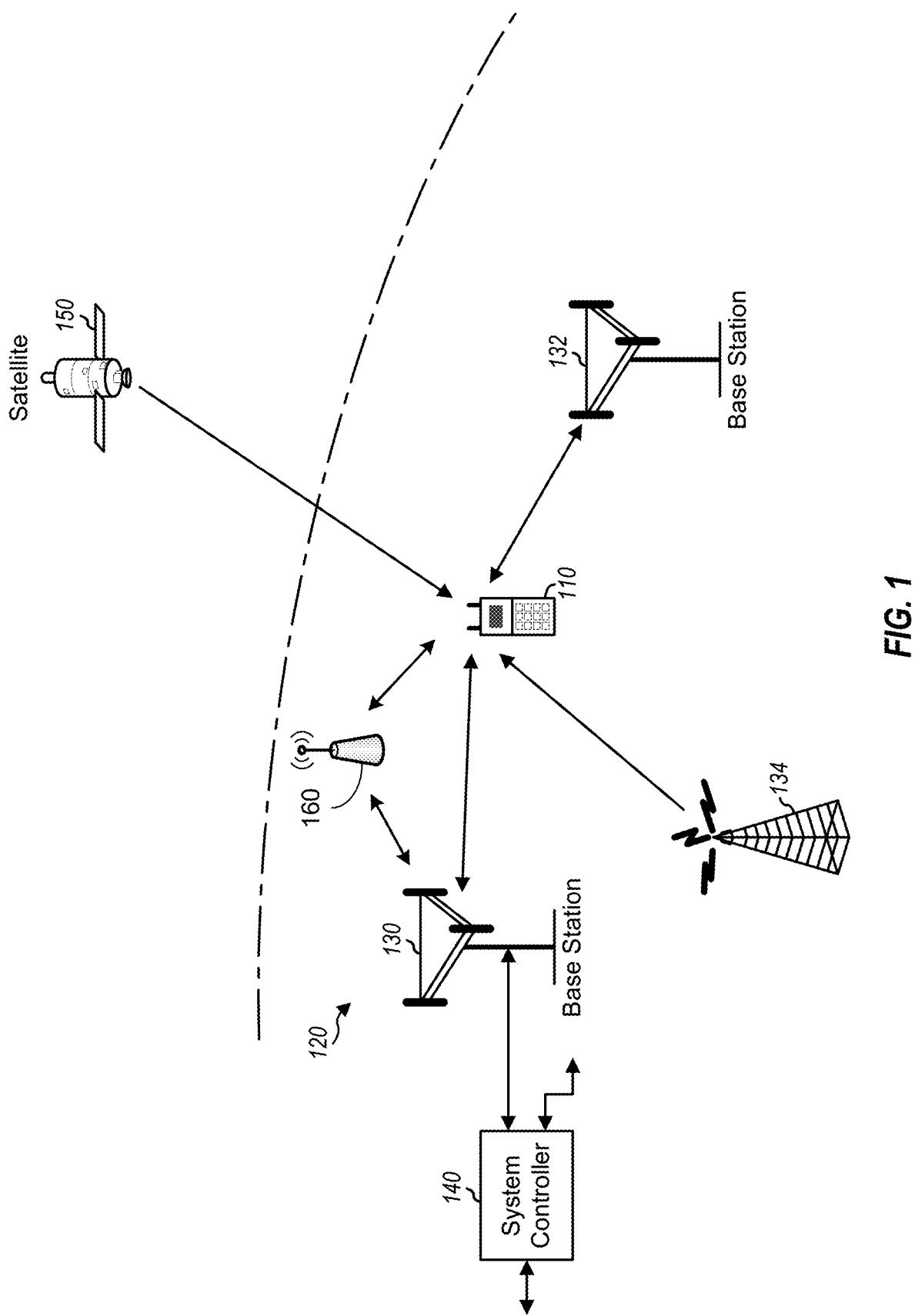
FIG. 1 is a diagram showing a wireless communication system communicating with a wireless device that can be implemented according to aspects described herein.

The detailed description set forth below in connection with the appended drawings is intended as a description of exemplary implementations and is not intended to represent the only implementations in which the invention may be practiced. The term "exemplary" used throughout the description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

Standard form factors for devices such as cell phones, tablets, laptop computers, cellular hotspot devices, and other such devices are subject to increasingly limited space. At the same time, additional wireless communication systems are being integrated into such devices. Performance and space tradeoffs are design considerations in all such devices. The addition of millimeter wavelength (mmW) modules that include mmW circuitry, transmission (Tx) and receiver (Rx) elements for mmW communications are one form of additional functionality that have been added to devices. An additional functionality that can be added which leverages such mmW modules is radar, such as frequency-modulated continuous wave (FMCW) radar. Such radar systems can operate in similar (or different) frequencies using similar technology.

Aspects described herein include devices with mmW antenna arrays that integrate radar antennas with one or more antennas for mmW communications. According to some aspects described herein, a device with one or more mmW modules for mmW communications can include gaps between mmW elements of a mmW module. The gaps can be used to position and configure radar antennas operating at or around 26 GHz, 60 GHz, or other such frequencies in a way that does not interfere with mmW communications using mmW antennas operating above approximately 24 GHz (e.g., FR2 mmW communication bands from 24.25 GHz to 43.5 GHz). In some examples, the radar antennas positioned in or aligned with the gaps can include slot antennas, which can operate as a sensor for FMCW functionality.

Aspects of a device with a mmW module integrating a radar antenna with mmW elements (e.g., an antenna array and other supporting circuitry for mmW communications) improve the performance of the device with additional functionality using the radar antenna. Aspects also involve device improvements through efficient usage of space integrating radar antennas into existing form factors while maintaining mmW communication device performance. radar antenna integration can provide further functionality when combined with existing systems, such as providing FMCW radar functionality, measuring exposure of nearby objects to electromagnetic radiation with radar measurements combined with power measurements or settings from mmW elements, among others. In some aspects, measurements of nearby objects can include measurement of vital signs of a person (e.g., heart rate or other biometric characteristic measurements), measurement of object types, or any other measurements from analyzing a difference between transmitted signal(s) and reflections generated from the transmitted signals. Additional aspects and device improvements will be apparent from the descriptions provided herein.

FIG. 1 is a diagram showing a wireless device 110 communicating with a wireless communication system 120. In accordance with aspects described herein, the wireless device can include a mmW module having a radar antenna integrated into gaps between mmW elements (e.g., mmW antennas in an array, and other such supporting circuitry) or along edges of mmW elements and edges of a mmW PCB. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. Communication elements of the wireless device 110 for implementing mmW and non-mmW communications in accordance with any such communication standards can be supported by various designs of a FMCW sensors (e.g., antennas) in accordance with aspects described herein. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, or other such mobile device (e.g., a device integrated with a display screen). Other examples of the wireless device 110 include a wireless modem, a personal digital assistant (PDA), a handheld device, a laptop computer, a smartbook, a netbook, a tablet, a cordless phone, a medical device, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS), etc.). Wireless device 110 may support one or more radio technologies for wireless communication such as LTE, WCDMA, CDMA 1×, EVDO, TD-SCDMA, GSM, 802.11, 5G, etc.

The wireless communication system 120 may also include a wireless device 160. In an exemplary embodiment, the wireless device 160 may be a wireless access point, or another wireless communication device that comprises, or comprises part of a wireless local area network (WLAN). In an exemplary embodiment, the wireless device 110 may be configured as a customer premises equipment (CPE), which may be in communication with a base station 130 and another wireless device 110, or other devices in the wireless communication system 120. In some embodiments, the CPE may be configured to communicate with the wireless device 160 using WAN signaling and to interface with the base station 130 based on such communication instead of the wireless device 160 directly communicating with the base station 130. In exemplary embodiments where the wireless device 160 is configured to communicate using WLAN signaling, a WLAN signal may include WiFi, or other communication signals.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2A:
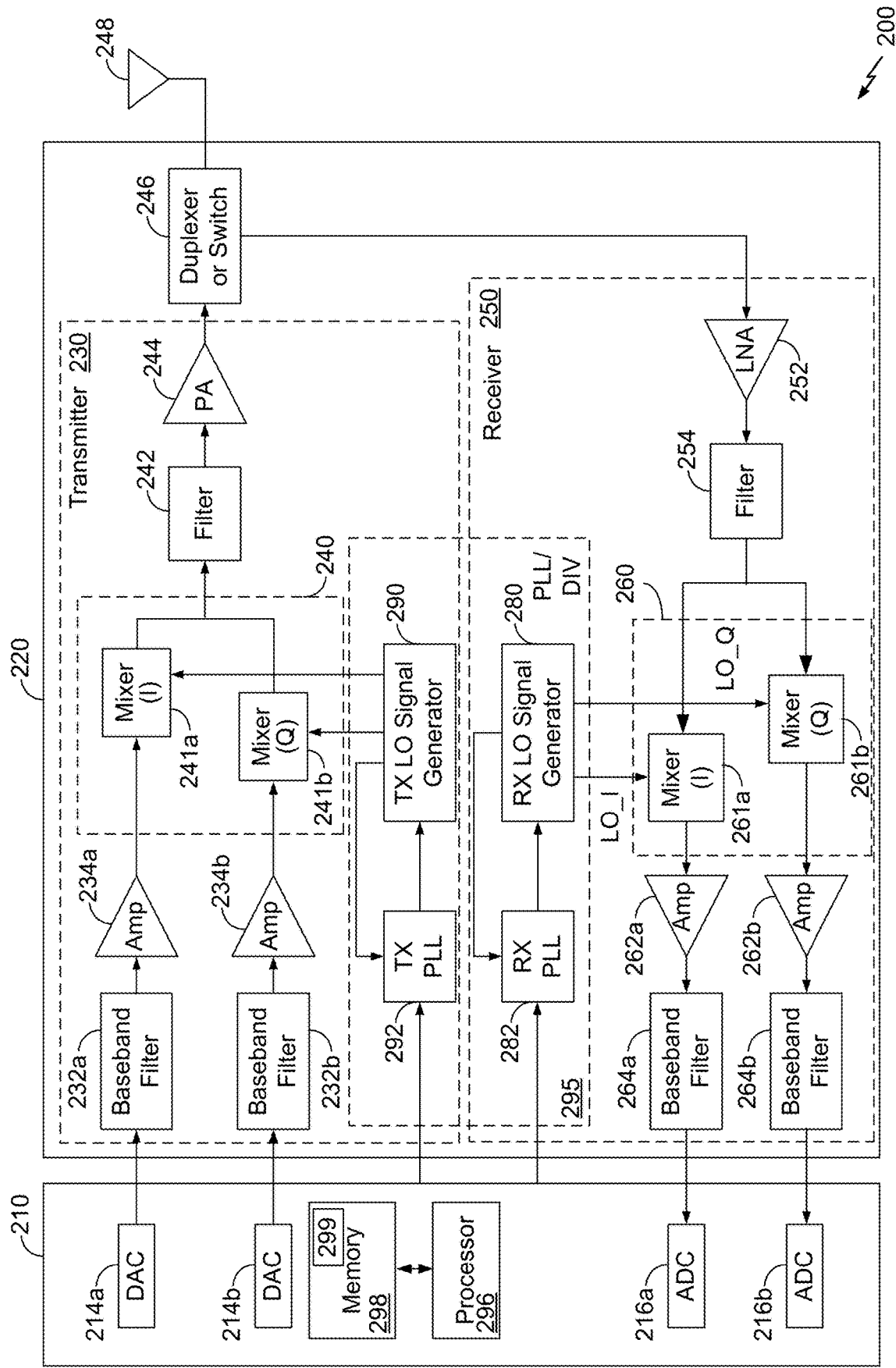
FIG. 2A is a block diagram showing portions of a wireless device in which aspects the present disclosure may be implemented.

FIG. 2A is a block diagram showing a wireless device 200 in which aspects of the present disclosure may be implemented. The wireless device 200 may, for example, be an embodiment of the wireless device 110 illustrated in FIG. 1. Circuitry described may be circuitry supporting mmW communications and/or radar functionality. The same circuitry or separate circuitry can be configured to integrate radar functionality with mmW communications antennas configured to avoid interference between the mmW communications and radar systems. In some examples, the wireless device 200 (or any of the devices described and/or illustrated hereinafter) may be an example of any of the devices illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, baseband (e.g., lowpass) filters 232a and 232b filter the I and Q analog transmit signals, respectively, to remove undesired images caused by the prior digital-to-analog conversion. Amplifiers (Amp) 234a and 234b amplify the signals from baseband filters 232a and 232b, respectively, and provide I and Q baseband signals. An upconverter 240 having upconversion mixers 241a and 241b upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier 244 amplifies the signal from filter 242 to obtain the desired output power level and provides a transmit RF signal. The transmit RF signal is routed through a duplexer or switch 246 and transmitted via an antenna array 248. While examples discussed herein utilize I and Q signals, those of skill in the art will understand that components of the transceiver may be configured to utilize polar modulation.

In the receive path, the antenna array 248 receives communication signals and provides a received RF signal, which is routed through duplexer or switch 246 and provided to a low noise amplifier (LNA) 252. The switch 246 is designed to operate with a specific RX-to-TX duplexer frequency separation, such that RX signals are isolated from TX signals. The received RF signal is amplified by LNA 252 and filtered by a filter 254 to obtain a desired RF input signal. Downconversion mixers 261a and 261b in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by baseband (e.g., lowpass) filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

In an exemplary embodiment, the RX PLL 282, the TX PLL 292, the RX LO signal generator 280, and the TX LO signal generator 290 may alternatively be combined into a single LO generator circuit 295, which may include common or shared LO signal generator circuitry to provide the TX LO signals and the RX LO signals. Alternatively, separate LO generator circuits may be used to generate the TX LO signals and the RX LO signals.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the switch 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, power amplifier 244 and LNA 252 (and filter 242 and/or 254 in some examples) may be implemented separately from other components in the transmitter 230 and receiver 250, and may be implemented on a millimeter wave integrated circuit. An example super-heterodyne architecture is illustrated in FIG. 2B.

Figure 2B:
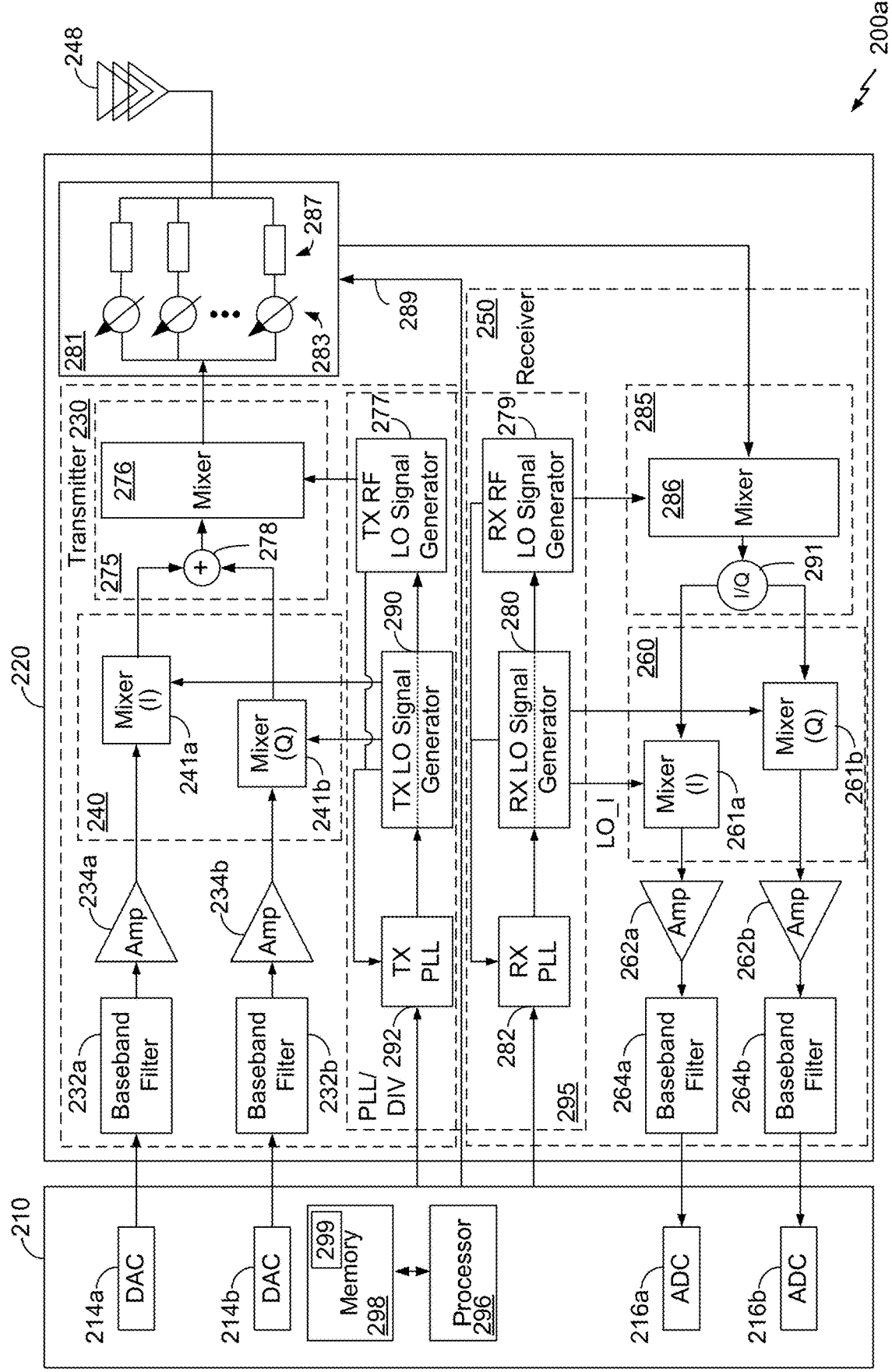
FIG. 2B is a block diagram showing portions a wireless device in which aspects of the present disclosure may be implemented.

FIG. 2B is a block diagram showing a wireless device in which aspects of the present disclosure may be implemented. Certain components, for example which may be indicated by identical reference numerals, of the wireless device 200a in FIG. 2B may be configured similarly to those in the wireless device 200 shown in FIG. 2A and the description of identically numbered items in FIG. 2B will not be repeated.

The wireless device 200a is an example of a heterodyne (or superheterodyne) architecture in which the upconverter 240 and the downconverter 260 are configured to process a communication signal between baseband and an intermediate frequency (IF). For example, the upconverter 240 may be configured to provide an IF signal to an upconverter 275. In an exemplary embodiment, the upconverter 275 may comprise summing function 278 and upconversion mixer 276. The summing function 278 combines the I and the Q outputs of the upconverter 240 and provides a non-quadrature signal to the mixer 276. The non-quadrature signal may be single ended or differential. The mixer 276 is configured to receive the IF signal from the upconverter 240 and TX RF LO signals from a TX RF LO signal generator 277, and provide an upconverted mmW signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 289 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the mmW transmit signal from the upconverter 275, alter the phase by an amount, and provide the mmW signal to a respective phased array element 287. Each phased array element 287 may comprise transmit and/or receive circuitry including one or more filters, amplifiers, driver amplifiers, and power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise an I/Q generation function 291 and a downconversion mixer 286. In an exemplary embodiment, the mixer 286 downconverts the receive mmW signal provided by the phase shift circuitry 281 to an IF signal according to RX mmW LO signals provided by an RX mmW LO signal generator 279. The I/Q generation function 291 receives the IF signal from the mixer 286 and generates I and Q signals for the downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect. For example, components of the antenna array 248 may be implemented on a substrate and coupled to an integrated circuit implementing the phase shift circuitry 281 via a flexible printed circuit board or other such substrate.

In some embodiments, both the architecture illustrated in FIG. 2A and the architecture illustrated in FIG. 2B are implemented in the same device. For example, a wireless device 110 or 200 may be configured to communicate with signals having a frequency below about 20 GHz using the architecture illustrated in FIG. 2A and to communicate with signals having a frequency above about 20 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from mmW and signals that have been downconverted from mmW to baseband via an IF stage may be filtered by the same baseband filter 264. In other embodiments, a first version of the filter 264 is included in the portion of the device which implements the architecture of FIG. 2A and a second version of the filter 264 is included in the portion of the device which implements the architecture of FIG. 2B.

Figure 2C:
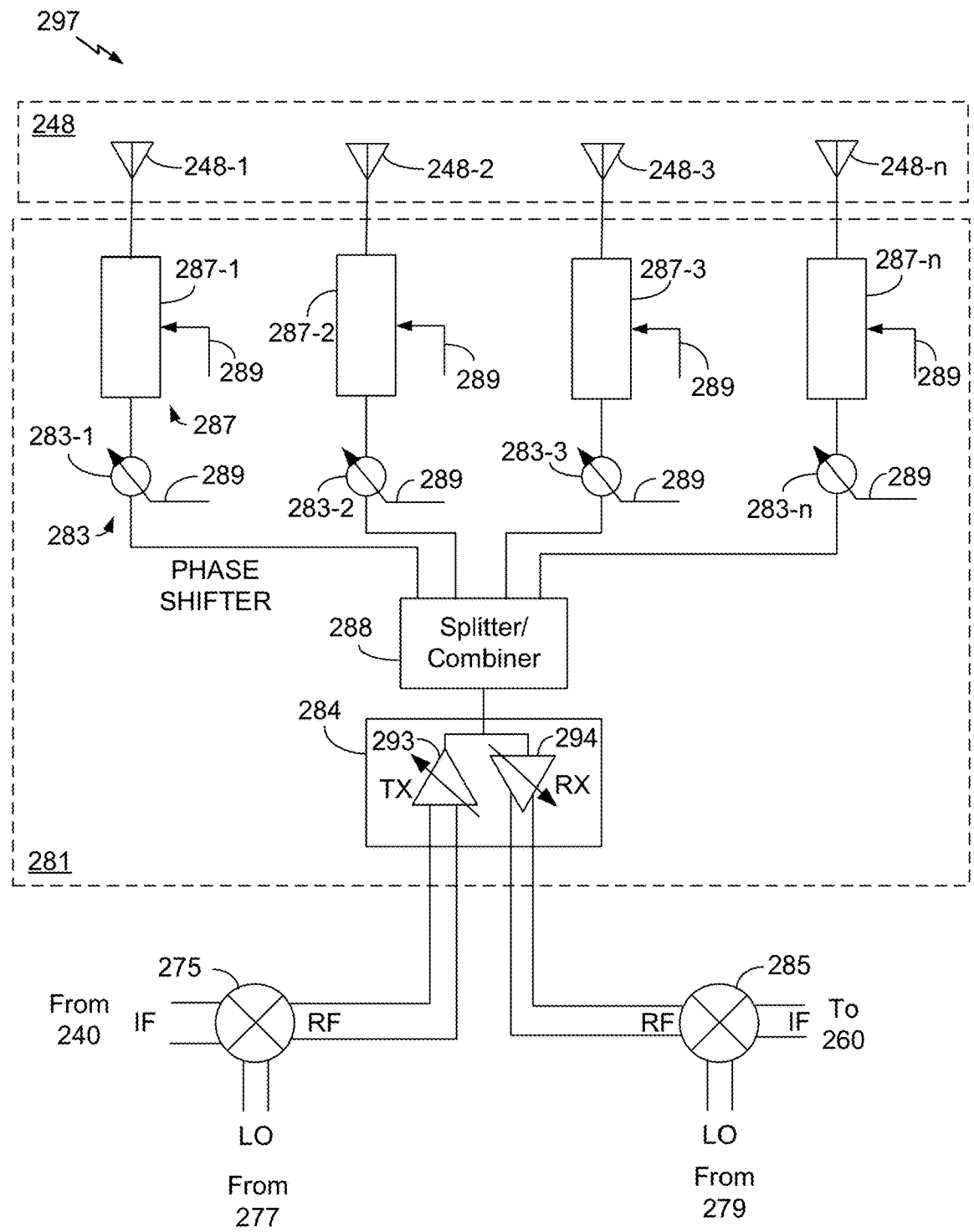
FIG. 2C is a block diagram illustrating aspects of a wireless device in which aspects of the present disclosure may be implemented.

FIG. 2C is a block diagram 297 showing in greater detail an embodiment of some of the components of FIG. 2B. In an exemplary embodiment, the upconverter 275 provides an mmW transmit signal to the phase shift circuitry 281 and the downconverter 285 receives an mmW receive signal from the phase shift circuitry 281. In an exemplary embodiment, the phase shift circuitry 281 comprises an mmW variable gain amplifier 284, a splitter/combiner 288, the phase shifters 283 and the phased array elements 287. In an exemplary embodiment, the phase shift circuitry 281 may be implemented on a millimeter-wave integrated circuit (mmWIC). In some such embodiments, the upconverter 275 and/or the downconverter 285 (or just the mixers 276, 286) are also implemented on the mmWIC. In an exemplary embodiment, the mmW VGA 284 may comprise a TX VGA 293 and an RX VGA 294. In some embodiments, the TX VGA 293 and the RX VGA 294 may be implemented independently. In other embodiments, the VGA 284 is bidirectional. In an exemplary embodiment, the splitter/combiner 288 may be an example of a power distribution network and a power combining network. In some embodiments, the splitter/combiner 288 may be implemented as a single component or as a separate signal splitter and signal combiner. The phase shifters 283 are coupled to respective phased array elements 287. Each respective phased array element 287 is coupled to a respective antenna element in the antenna array 248. In an exemplary embodiment, phase shifters 283 and the phased array elements 287 receive control signals from the data processor 210 over connection 289. The exemplary embodiment shown in FIG. 2C comprises a 1×4 array having four phase shifters 283-1, 283-2, 283-3 and 283-n, four phased array elements 287-1, 287-2, 287-3 and 287-n, and four antennas 248-1, 248-2, 248-3 and 248-n. However, a 1×4 phased array is shown for example only, and other configurations, such as 1×2, 1×6, 1×8, 2×3, 2×4, or other configurations are possible.

FIGS. 3A, 3B and 3C are block diagrams collectively illustrating some aspects of a millimeter wave (mmW) module in accordance with some aspects of the disclosure. The circuitry above illustrates mmW elements that can be disposed in a mmW module (e.g., in an IC coupled to a mmW PCB). The elements of the mmW antenna arrays described can, for example, have gaps where radar antennas can be positioned as described below. Details of radar antenna integration is described below with respect to FIGS. 4A-B, 5A-B, and 6A-D. Note that while the examples in FIG. 3 are described with respect to a module, it is not necessary for the antenna arrays described herein to be packaged in a module (e.g., with a mmW IC).

Figure 4A:
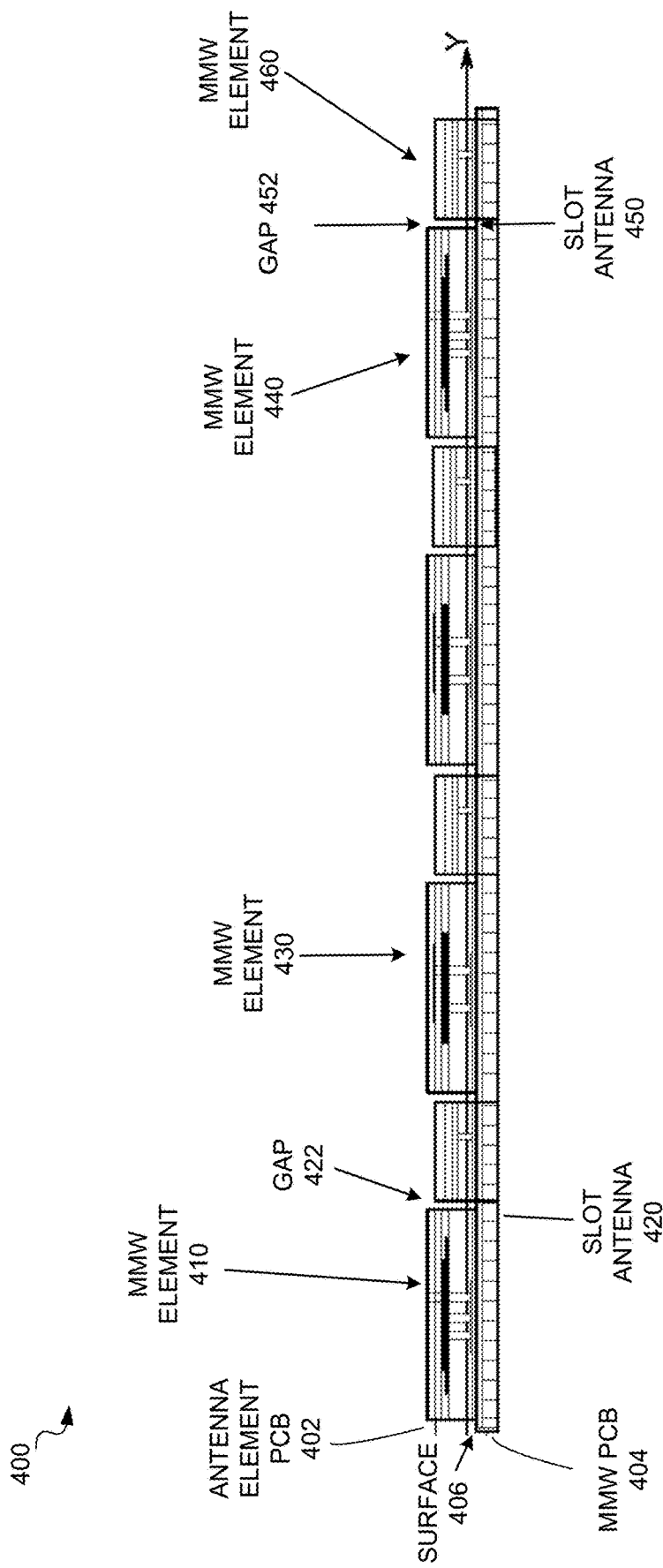
FIG. 4A is a diagram illustrating aspects of a mmW antenna array in accordance with aspects described herein.
Figure 4B:
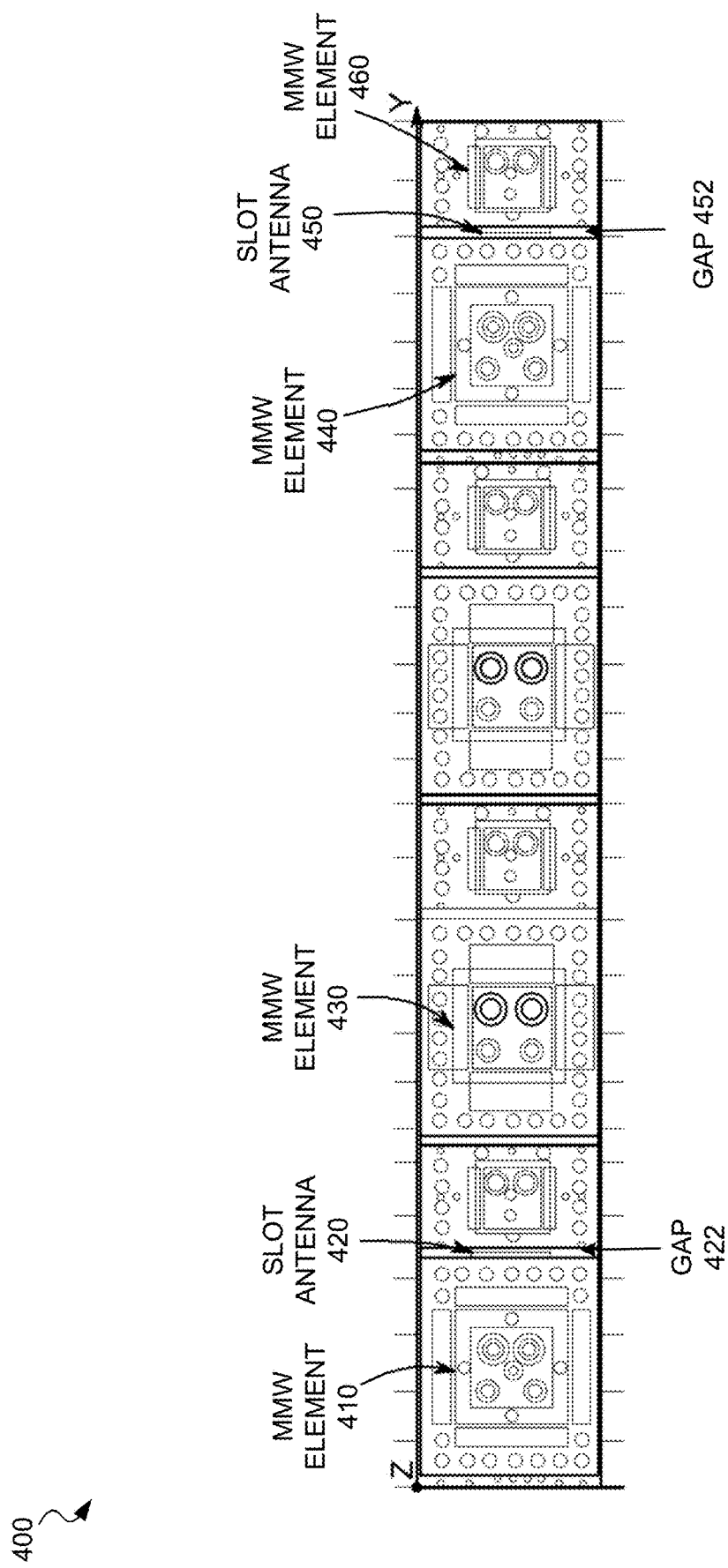
FIG. 4B is a diagram illustrating aspects of a mmW antenna array in accordance with aspects described herein.

FIG. 3A shows a side view of a millimeter wave (mmW) module 300. The mmW module 300 may include an example of the mmW antenna arrays shown in FIGS. 4A-B, 5A-B, and 6A-D. In some aspects, the mmW module 300 may comprise a 1×8 phased array fabricated on a substrate 303. In some aspects, the mmW module 300 may comprise a mmWIC 310, a PMIC 315, a connector 317 and a plurality of antennas 321, 322, 323, 324, 325, 326, 327 and 328 fabricated on a substrate 303. FIG. 3B is a top perspective view of the mmW module 300 showing the mmWIC 310, a PMIC 315, a connector 317 and a plurality of antennas 321, 322, 323, 324, 325, 326, 327 and 328 on the substrate 303. FIG. 3C is a bottom perspective view of the mmW module 300 showing the antennas 321, 322, 323, 324, 325, 326, 327 and 328 on the substrate 303. FIG. 3D shows an alternative embodiment of a millimeter wave (mmW) module 350. The mmW module 350 may be similar to the mmW module 300 shown in FIG. 3A, but is arranged as a 1×6 array. In some aspects, the mmW module 350 may comprise a 1×6 phased array fabricated on a substrate 353. In some aspects, the mmW module 350 may comprise a plurality of antennas 371, 372, 373, 374, 375 and 376 fabricated on the substrate 353. Other aspects include devices where the mmW module 350 may comprise a plurality of antennas of an array on separate PCBs mounted to a main mmW PCB as illustrated by the example of FIGS. 4A and 4B FIGS. 4A and 4B include diagrams illustrating aspects of a mmW antenna array 400 in accordance with aspects described herein. FIG. 4A shows a side view of the mmW antenna array 400. The array 400 may be packaged in a module (for example with a mmW IC and/or other components), for example as described with respect to FIG. 3. FIG. 4B shows a top-down view of the mmW antenna array 400. The mmW antenna array 400 includes a primary mmW PCB 404 which is used as a primary substrate for elements of a mmW antenna array. The mmW antenna array is made up of mmW elements in a linear pattern along the length of the mmW PCB 404, including mmW element 410, mmW element 430, mmW element 440, and mmW element 460. The mmW elements can include mmW antennas (e.g., patch antennas, or other such mmW antennas), and can be coupled to any circuitry described above (e.g., the circuitry of FIGS. 2A, 2B, and 2C). In the example of FIGS. 4A and 4B, the mmW elements are structured as assemblies fabricated on antenna element PCBs. For example, as illustrated, mmW element 410 is fabricated on antenna element PCB 402. The other mmW elements are similarly fabricated using PCBs that are mounted to surface 406 of the mmW PCB. FIGS. 4A and 4B show an example with antennas and other mmW elements implemented on separate PCBs with discrete PCB arrangements mounted on an active PCB (e.g., mmW PCB 404), where the active PCB can include active components. In other examples, as described above, elements of a mmW antenna array can be implemented on the same PCB (e.g., directly on mmW PCB 404). Further, while every mmW element is illustrated as being formed in a separate antenna element PCB, two or more mmW elements may be formed in a shared antenna element PCB.

The mmW elements (e.g., mmW elements 410, 430, 440, 460, etc.) are structured with gaps to allow isolation between the various elements of the antenna array implemented as part of mmW antenna array 400. In this context, gaps refer to spacing between radiators of the mmW elements, and do not require a spacing between antenna element PCBs or substrates (which is referred to below as a substrate gap). In some implementations, such gaps can be approximately 0.5 to 0.15 millimeters (mm) across. In other implementations, other gap distances can be used. For example, mmW element 410 and mmW element 430 are adjacent elements separated by gap 422. Similarly, mmW elements 440 and 460 adjacent elements separated by gap 452. In accordance with aspects described herein, slot antennas can be positioned within these gaps to provide FMCW radar functionality in conjunction with additional FMCW supporting circuitry. As illustrated, the gap 422 is used for placing a slot antenna 420, and the gap 452 is used for placing a slot antenna 450.

While the example above illustrates a gap between PCBs or other such substrates, in some implementations, mmW elements can be disposed on a shared substrate. In described implementations, the gap between the mmW elements (e.g., between radiators thereof) can be used for slot antenna placement (e.g., or placement of other radar antennas). In some aspects, antennas can be placed in gaps or at ends of a mmW module even if the antenna substrate is right above the slots. In such implementations, a substrate gap may or may not align with the element gap, and a radar antenna may be positioned out of alignment with the substrate gap (e.g., so that the substrate is above the antenna) or under the substrate when there is no substrate gap.

In some aspects, a mmW antenna array such as mmW antenna array 400 can include one or more radar antennas, such as a single slot antenna or multiple slot antennas. For example, a single slot antenna can be used to both transmit a FMCW radar signal and receive reflections of the FMCW radar signal. Radar circuitry can be coupled to the single slot antenna to generate the FMCW radar signal and to process the reflections of the FMCW radar signal to identify objects of interest. Processing circuitry can then be used with the data identifying objects of interest to perform additional analysis in conjunction with the data identifying objects (e.g., object tracking over time, facial recognition, human vital signal extraction, object electromagnetic exposure measurements using transmit and receive power data from the mmW communications system or other systems, tracking maximum permissible exposure (MPE) of detected objects, modifying transmit power in conjunction with MPE measurements, etc.). In some examples, the radar processing circuitry is disposed in a mmW IC, such as the mmW IC 310, or distributed between a mmW IC and another processor such as elements of the transceiver 220 or data processor 210. In some examples, both circuitry for processing mmW data communications and circuitry for processing radar signals is included in the same IC (e.g., the IC 310). Integrating radar and mmW data communications antennas in an array may not only allow for form factors which meet stringent requirements (e.g., having a size that can be disposed in a side edge of a mobile device), but such integration may allow for efficient processing of signals from both types of antennas, for example by circuitry in a common IC.

In other aspects, the mmW antenna array can include two or more slot antennas, such as slot antenna 420 and slot antenna 450 of mmW antenna array 400. In some implementations, a first slot antenna is used to transmit a FMCW radar signal, and a second antenna is used to receive reflections of the FMCW radar signal. Separating the transmit and receive antennas (e.g., sensors) of the FMCW radar system implemented in a mmW antenna array such as mmW antenna array 400 can avoid interference between the transmit and reflected (e.g., received) signals, and can allow the supporting connections for the transmit and receive circuitry to be distributed to different parts of the mmW antenna array 400. In other implementations, additional FMCW or other radar antennas can be used, such as with orthogonal polarization or other sensor positioning. Additional arrangements of radar sensors are described below with respect to FIGS. 6A, 6B, 6C, 6D, 6E, and 6F.

FIG. 4 illustrate differently configured mmW elements being included in the antenna array 400. For example, the mmW element 460 is a different size than the mmW element 440. The mmW elements may be configured as different antenna types (e.g., patch and dipole), for different frequencies, to transmit or receive in different polarizations, etc. In other examples, all of the mmW elements in the array are similarly configured. Further, while the radar antennas (e.g., the slot antennas 420, 450) are illustrated as being included in a PCB separate from PCBs in which the mmW elements are formed, the radar antennas and mmW elements (e.g., mmW communications antennas) may all be formed in the same PCB.

As illustrated in FIG. 4A, the radar antennas (e.g., the slot antennas 420, 450) may be disposed fully "below" (in the illustrated perspective) the mmW data communications antennas (e.g., the mmW elements). For example, the radar antennas may be formed in and/or below the surface 406, with the mmW elements being above the surface 406. When the radar antennas and the mmW elements are formed in a single PCB, radiating structures of the radar antennas may be formed on a first side of particular layer of the PCB (e.g., one of the internal or middle layers of the PCB) while radiating structures of the mmW elements (e.g., mmW data communications antennas) may be formed on another (opposite) side of the particular layer. In examples in which radar antennas are disposed "below" the mmW data communications antennas, the radar antennas may effectively be invisible to the mmW data communications antennas, allowing for integration of the radar antennas into the array without (significantly) degrading performance of the mmW data communications antennas or necessitating movement of the mmW data communications antennas from a location or spacing in which they would otherwise have been disposed (in comparison to an array without the radar antennas).

Figure 5A:
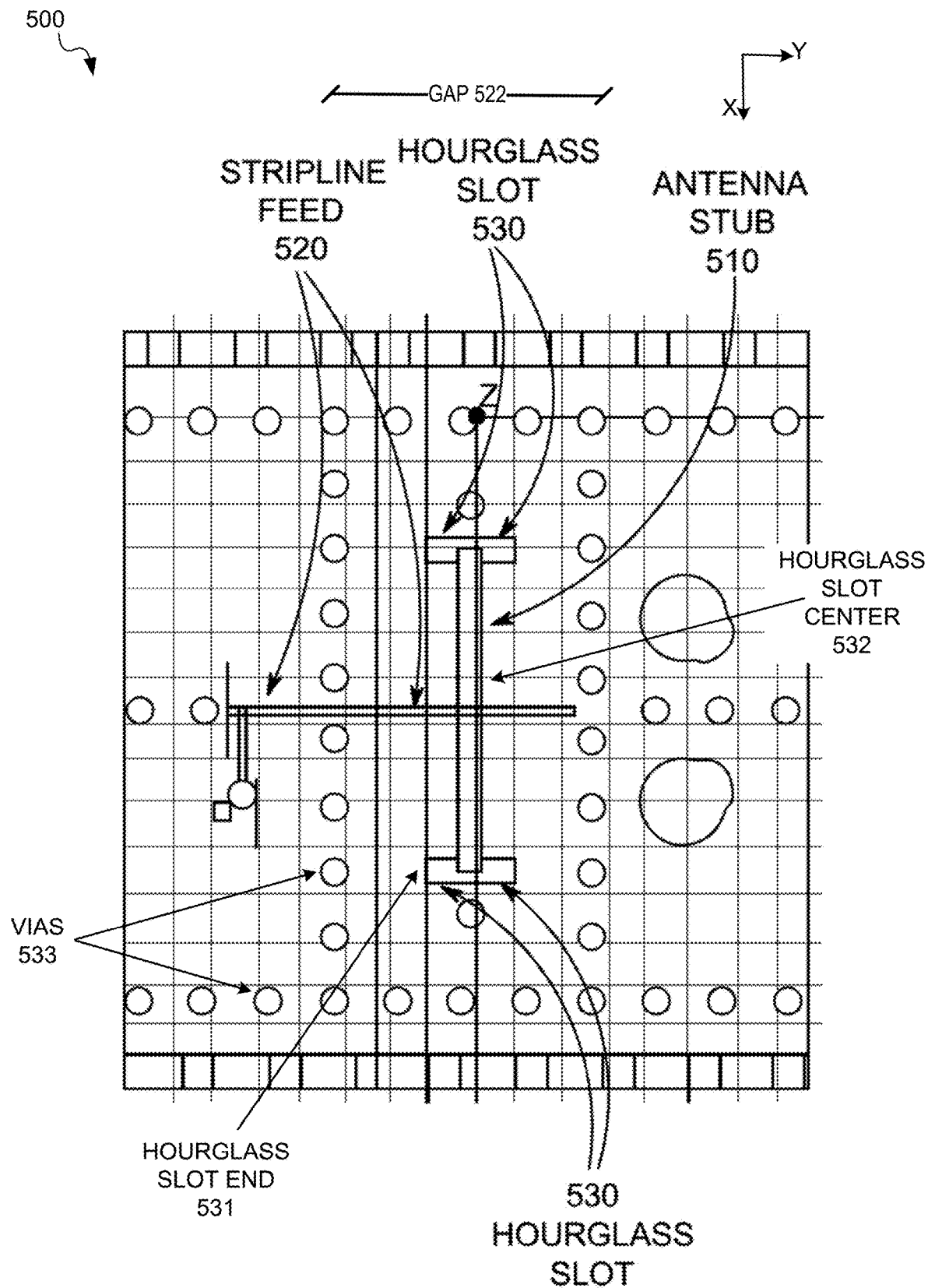
FIG. 5A is a diagram illustrating aspects of a mmW antenna array including a radar antenna in accordance with aspects described herein.
Figure 5B:
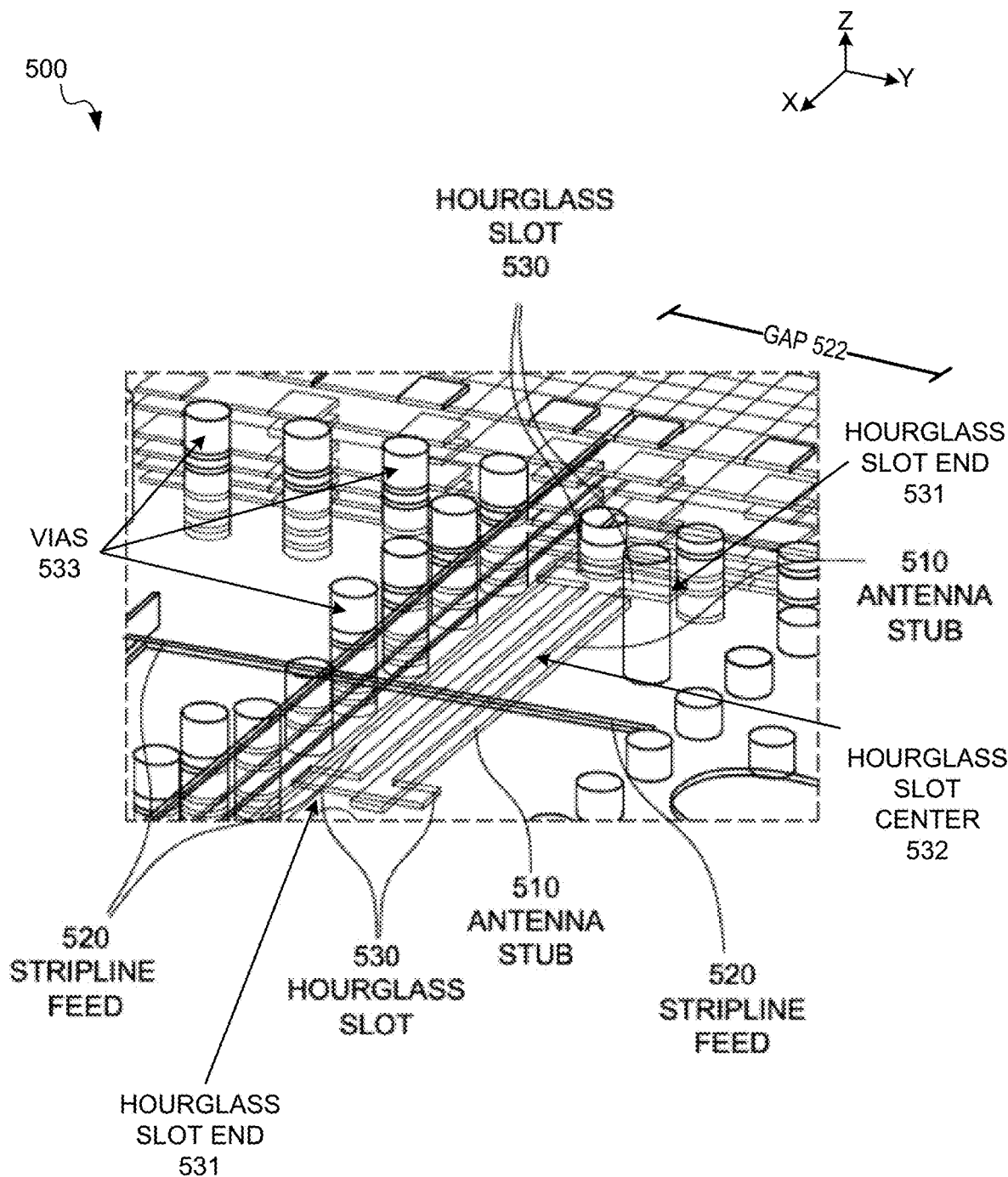
FIG. 5B is a diagram illustrating aspects of a mmW antenna array including a radar antenna in accordance with aspects described herein.

FIG. 5A is a diagram illustrating aspects of a mmW antenna array 500 including an FMCW antenna in accordance with aspects described herein. FIG. 5B is a diagram illustrating aspects of the mmW antenna array 500 including a radar antenna in accordance with aspects described herein. FIG. 5A shows a top down view of the mmW antenna array 500 (e.g., similar to the top-down view of FIG. 4B). FIG. 5B shows a top-side diagonal view of the mmW antenna array 500.

The mmW antenna array 500 includes a radar antenna (which may be configured for FMCW or coupled to circuitry that provides or processes an FMCW signal) implemented using antenna stub 510 coupled to a signal stripline feed 520 that provides a radar signal, receives a reflection of the radar signal, or performs both depending on the implementation. An hourglass slot 530 (e.g., an hourglass-shaped slot) including hourglass slot ends 531, and hourglass slot center 532 is created in the illustrated top surface of the mmW antenna array 500 PCB (e.g., the PCB 404), with the antenna stub 510 disposed in the mmW antenna array 500 PCB below the hourglass slot center 532. As described above, the antenna stub 510 and hourglass slot center 532 are positioned in gap 522 (e.g., gap 422, 452) between two radiators of) mmW elements that are part of mmW communications structures of the mmW antenna array 500. In the illustrated example, the radar antenna (e.g., including the antenna stub 510, the hourglass slot 530 made up of hourglass slot ends 531 and hourglass slot center 532, and stripline feed 520) is positioned in a middle portion of gap 522 between two adjacent mmW elements (not shown in FIGS. 5A and 5B).

The stripline feed 520 is connected to supporting FMCW radar circuitry. Depending on the particular implementation, this can include circuitry for generating FMCW signals, circuitry for analyzing reflections of the FMCW signals, both circuitry for generating FMCW signals and analyzing FMCW signal reflections, and other supporting circuitry. In some implementations, the FMCW antenna is configured to operate at frequencies around approximately 26 GHz. In some examples, the FMCW antenna is configured to operate at frequencies between approximately 57 GHz and 71 GHz. In other examples, other such frequencies or frequency ranges can be used. In some examples, FMCW sensors (e.g., antennas) can be implemented in a single mmW module to support multiple FMCW radar frequencies. For example, a single mmW module can include mmW circuitry supporting mmW communications above approximately 24 GHz, a first FMCW antenna system (e.g., including one or more FMCW antennas) operating at a first frequency (e.g., 26 GHz), and a second FMCW antenna system (e.g., including second one or more FMCW antennas different from the antennas for the first FMCW antenna system) operating at a second frequency different from the first frequency (e.g., 60 GHz).

In one implementation, a length of a slot is approximately 1.6 mm, a width of the narrow part of the hourglass shaped slot is approximately 0.1 mm, and a width of the wide (e.g., top and bottom) hourglass widths is approximately 0.4 mm. In some implementations, an element substrate gap distance between adjacent substrates (e.g., when mmW elements are mounted on element substrates on the main substrate). In some implementations, element substrates are not used, and so no substrate gap is present. In some implementations, some or all of the mmW elements use shared elements substrates. In some implementations with shared element substrates, a slot antenna may be positioned in a gap (e.g., an element gap) below the element substrate and on a surface or layer of the mmW PCB (e.g., or another such mmW module substrate). In some implementations, a gap between mmW elements (e.g., an element gap) is approximately 1 mm (e.g., 1.1 mm). Such a gap (e.g., the element gap) may be defined the extent of patches and/or parasitics for a corresponding element. For some elements, the element boundary may be associated with metal layers of the element. In other aspects, mmW elements may have a boundary defined by the space associated with a position where the mmW element interferes more than a threshold amount with transmission or reception of signals at an antenna (e.g., a slot antenna) positioned near the element boundary, or may have a boundary defined by an extremity of a radiator or metal elements parasitically coupled to the radiator (which may have a longest edge greater than about one tenth or one quarter of an operating wavelength). While particular dimensions are provided above, in other implementations, other such dimensions can be used for a slot antenna, based on the wavelengths used by the system that includes the slot antenna, and the impacts of surrounding elements on the slot antenna performance.

As indicated above, gap 522 can be positioned between two adjacent mmW elements (e.g., adjacent mmW elements 410, 430 or adjacent mmW elements 440, 460). In various implementations, either of the adjacent mmW elements on either side of gap 522 or both of the elements can include antenna elements configured for communicating at mmW frequencies (e.g., above approximately 24 GHz) as part of one or more mmW antennas or a mmW antenna array of mmW antenna array 500. In some examples, the radar antenna (e.g., including antenna stub 510) is positioned in a first surface (e.g., the top surface 406 in FIG. 4A and the surface visible from the viewing perspective in FIGS. 5A and 5B), which is shown as the upper surface of the main PCB of the mmW module in the gap 522 between the adjacent mmW elements. Positioning the FMCW antenna in the first surface of the main PCB of the mmW module in the gap 522 allows the radar operation to be implemented with limited interference with the mmW communications. In some aspects, the stripline feed 520 and the antenna stub 510 are particularly configured to avoid interference between the signals of the radar systems and the signals of the mmW communications systems. As shown, the stripline feed 520 is in the same layer (or can be in another layer, such as an adjacent layer) as the hourglass shaped slot 530. The slot 530 can be an opening in the ground layer right above the stripline feed 520. The layer may be the top layer of the mmW PCB of the mmW antenna array 500. In some implementations, a "cavity" for the slot 530 can be formed with the illustrated vias around the slot from the top and bottom ground layers supporting the strip line feed 520. In some examples, one or more walls of the "cavity" are formed of a solid portion of a conductor (e.g., metal) instead of using a series of vias. In the illustrative example of FIG. 5B, positioning the antenna stub 510 of the radar sensor along with the hourglass-shaped slot at the surface of the mmW PCB can assist in avoiding interference between these systems.

FIGS. 6A, 6B, 6C, 6D, 6E, and 6F are block diagrams illustrating implementations of a mmW antenna array 600 in accordance with aspects of the disclosure. FIGS. 4A-B and 5A-B illustrate FMCW antennas implemented along a long and narrow gap between adjacent mmW elements of mmW antenna array 400,500. The mmW antenna array 600A, 600B, 600C, and 600D illustrate alternative implementations of radar antennas in gaps between mmW elements 610. The mmW antenna array 600A, 600B, 600C, and 600D illustrate not only different orientations of radar (e.g., FMCW) antennas, but also different numbers of radar antennas in a single mmW antenna array. The example mmW antenna array 400 of FIGS. 4A and 4B, for example, includes two slot antennas 420 and 450, to allow one radar antenna for radar signal transmission, and another radar antenna for sensing reflections of the radar signal transmission.

Figure 6A:
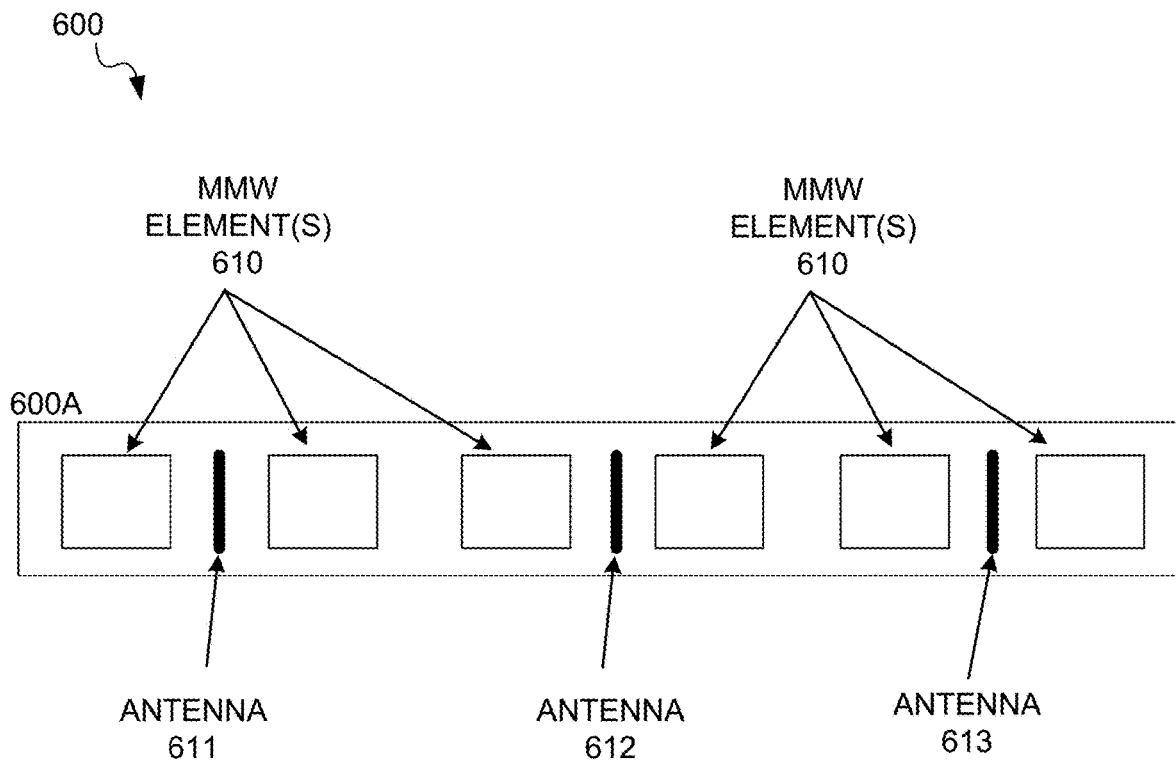
FIG. 6A, FIG. 6B, FIG. 6C, FIG. 6D, FIG. 6E, and FIG. 6F are block diagrams illustrating a mmW antenna array in accordance with aspects of the disclosure.

The mmW antenna array 600A of FIG. 6A includes three radar antennas 611, 612, and 613, each between sequential pairs of adjacent mmW elements 610. Such a configuration can, for example, be used to have a single radar transmission element (e.g., antenna 611) for a first frequency, a single FMCW reflection detection element for the first frequency (e.g., antenna 613), and a third FMCW sensor element to transmit and detect reflections at a second frequency (e.g., antenna 612). In other implementations, a single slot antenna transmission structure can be used with multiple receive sensors (e.g., one FMCW antenna for transmission, and two for reception).

Figure 6B:
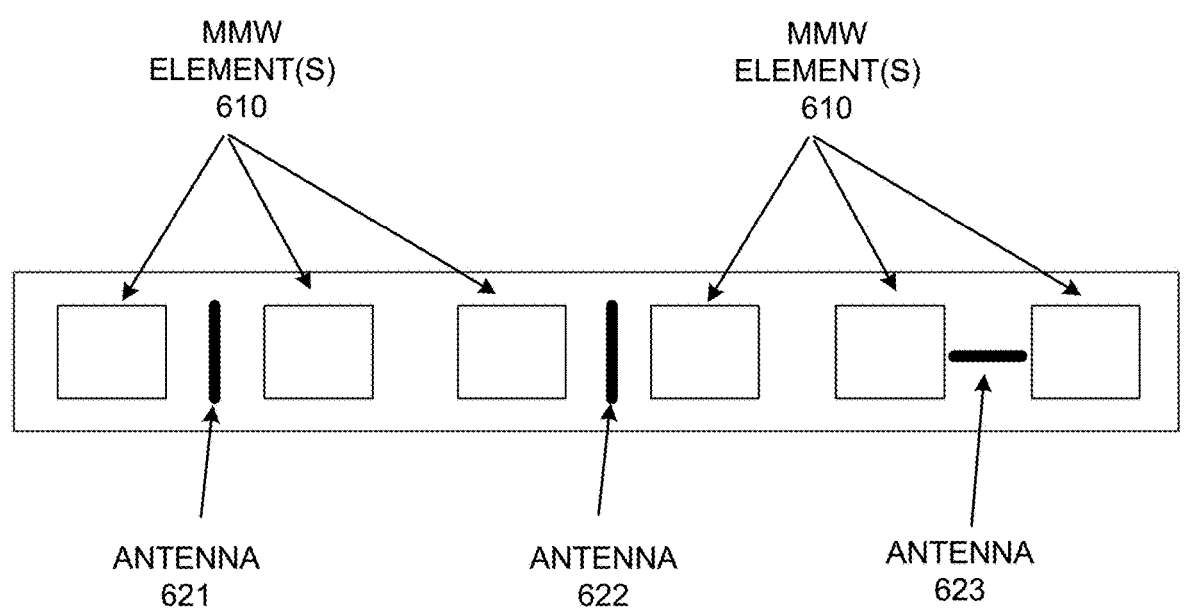

The mmW antenna array 600B of FIG. 6B includes an antenna 623 oriented in a mutually orthogonal position from antennas 621 and 622. The antennas 621 and 622 are positioned along a gap between respective adjacent mmW elements 610. The antenna 623 Is configured across a gap for the corresponding mmW elements 610 associated with the antenna 623. In such a configuration, antennas 621 and 622 can be used as separate transmit and receive antennas for a first frequency, and antenna 623 can be used to transmit and receive orthogonally oriented radar signals at the same frequency or at a different frequency. In some examples, another slot antenna can be overlaid with the antenna 623 (e.g., orthogonally to the antenna 623), such that two polarizations may be transmitted and/or received.

Figure 6C:
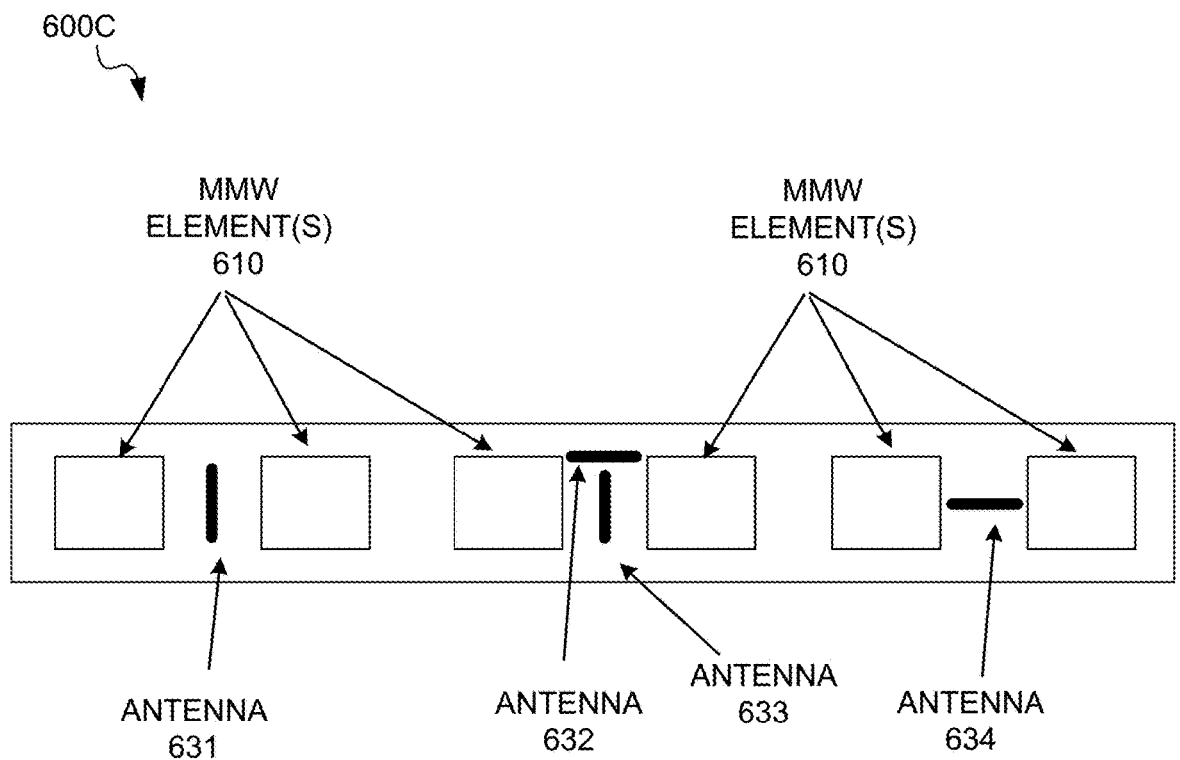

The mmW antenna array 600C of FIG. 6C includes orthogonally oriented antennas 631 and 634 as single antennas between adjacent mmW elements 610 (e.g., as antennas by themselves in gaps between adjacent mmW elements). Antennas 632 and 633 are positioned in a shared gap between the same adjacent mmW elements. Positioning antennas 632 and 633 in the same gap allows the orthogonal radar signals from the two antennas to originate from nearly the same position in the mmW antenna array 600C.

Figure 6D:
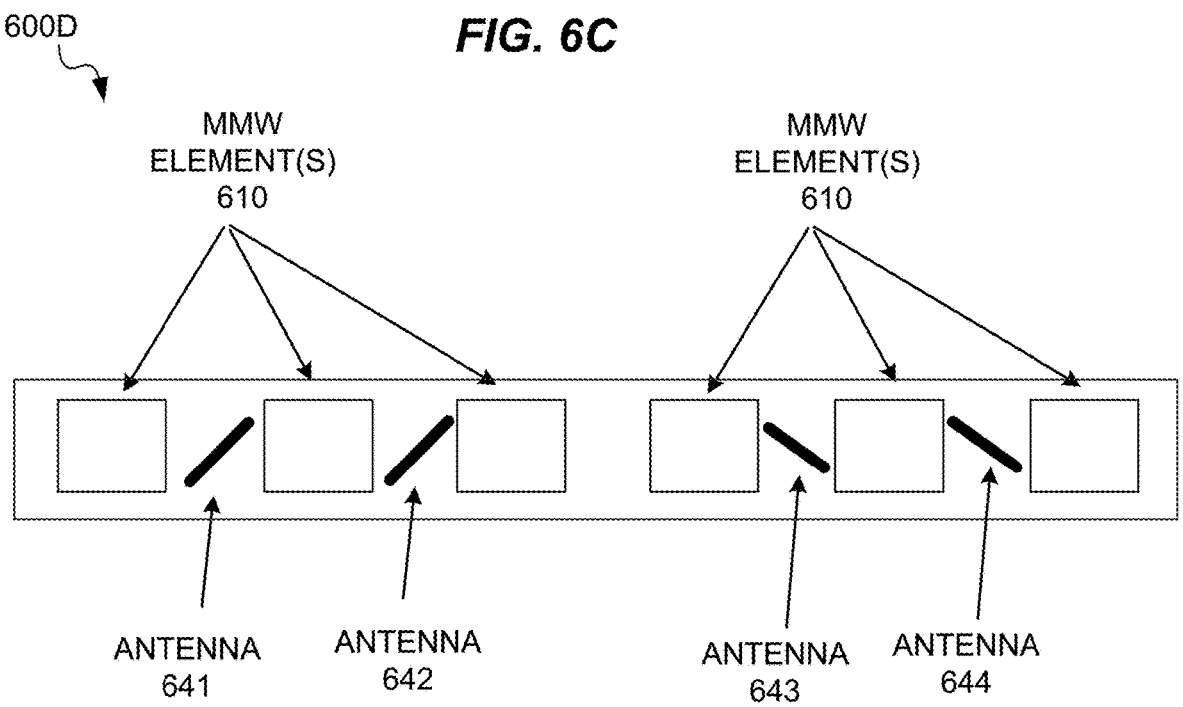

In the implementations above, the radar antennas are either oriented along a length of a gap between adjacent mmW elements or directly across the gap between adjacent mmW elements. The mmW antenna array 600D includes antennas diagonally oriented across the gaps between mmW elements 610. The particular implementation of FIG. 6D shows antennas 641 and 642 positioned diagonally across two gaps, with antennas 643 and 644 positioned orthogonally to the positioning of both antennas 641 and 642. The configuration of the radar antennas in the mmW antenna array 600D allows the gap size to be standardized for all antennas 641-644 while also allowing mutually orthogonal radar signals.

Figure 6E:
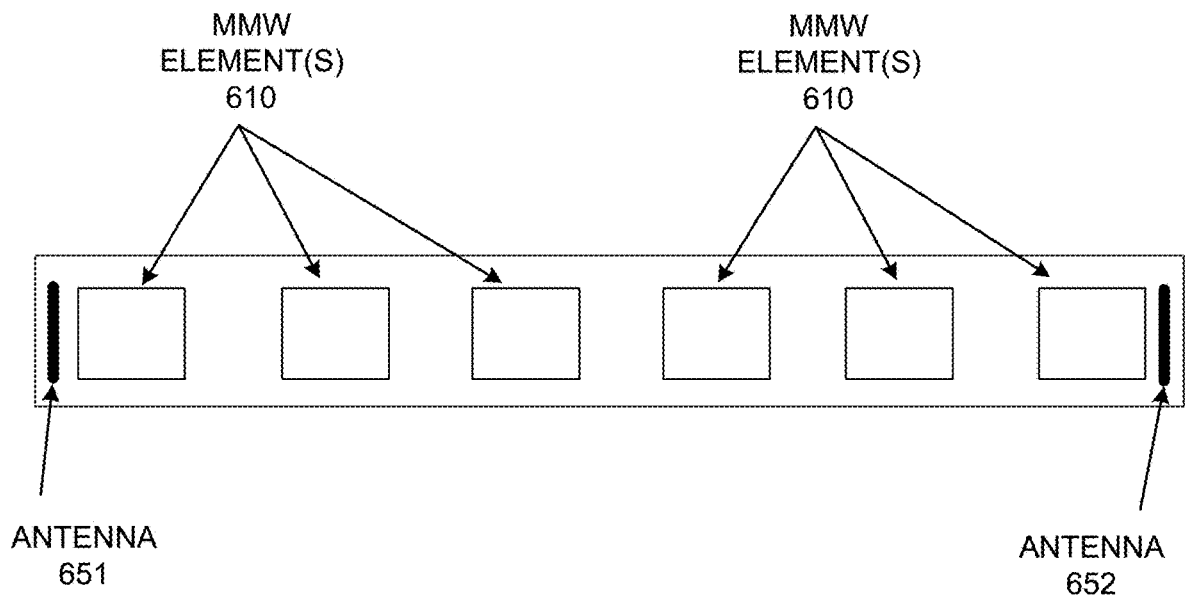
Figure 6F:
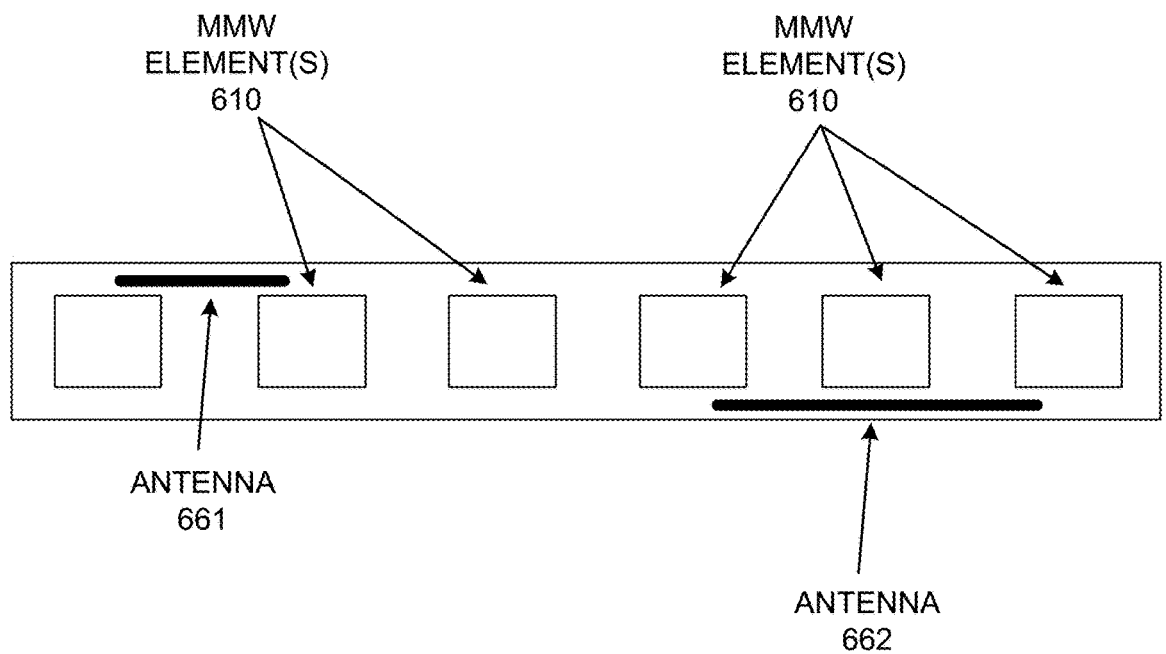

In FIG. 6E, antennas 651 and 652 are at short edges of a mmW antenna array, and in FIG. 6F, antennas 661 and 662 are positioned at long edges of a mmW antenna array. The antenna 661 is positioned at an edge between two mmW elements 610, and the antenna 662 is positioned at an edge of a mmW element 610. In various implementations, either or both positions can be used depending on a design and interference between mmW and slot antenna elements. Any such design allowing the mmW and slot antennas to operate without mutual interference and with acceptable general performance can be used. A primary distinction between the configurations of FIGS. 6A-F is an amount of space (e.g., an element gap distance) needed in between the elements to implement these configurations. If the gap between elements is small a vertical configuration may be used as the diagonal and horizontal slot configurations might overlap with the elements above the slot, causing interference. Such interference refers to signals and antenna elements disrupting signals to or from another antenna. To avoid mutual interference, the radar antenna (e.g., a slot antenna) of the antenna array is configured to avoid or limit disruption of signals sent to or from the mmW communications antennas, and the mmW communications antennas are similarly configured to avoid or limit disruption (e.g., interference) with signals sent to or from the slot antennas.

In arrays in which three or more radar antennas are implemented, the radar antennas may be regularly spaced (e.g., have an approximately uniform spacing therebetween), or the spacing between them may be irregular or varied. For example, the radar antennas in FIG. 6A are approximately regularly spaced. If all of the radar antennas in FIG. 6D were configured with the same polarization, they would have a varied or irregular spacing.

While configurations are illustrated in which there are less radar antennas than mmW communications antennas, an array may include more radar antennas than mmW communications antennas. For example, a radar antenna may be included between every mmW element. In some examples, a radar antenna may also be disposed at one or both ends of the line of mmW elements.

Each of the radar antennas in an array may be configured similarly, or their configuration may vary. For example, different radar antennas may be configured to radiate at different frequencies and/or polarizations, as described above. In some examples, a length of slot, a width of the hourglass shape, a size of stub, etc. may very between slot antennas.

In some examples, the radar antennas are configured to radiate in a band having a frequencies around 60 GHz. In some examples, the mmW communications elements are configured to radiate in bands from approximately 24 GHz to approximately 52 GHZ. In other embodiments, frequencies of the radar antennas and the mmW elements may overlap.

FIGS. 3-6 illustrate linear arrays of mmW elements, but 2D arrays may also be implemented. In some such examples, radar antennas (e.g., slot antennas) maybe disposed between any two mmW elements in the 2D array, or at an edge of the 2D array.

Figure 7:
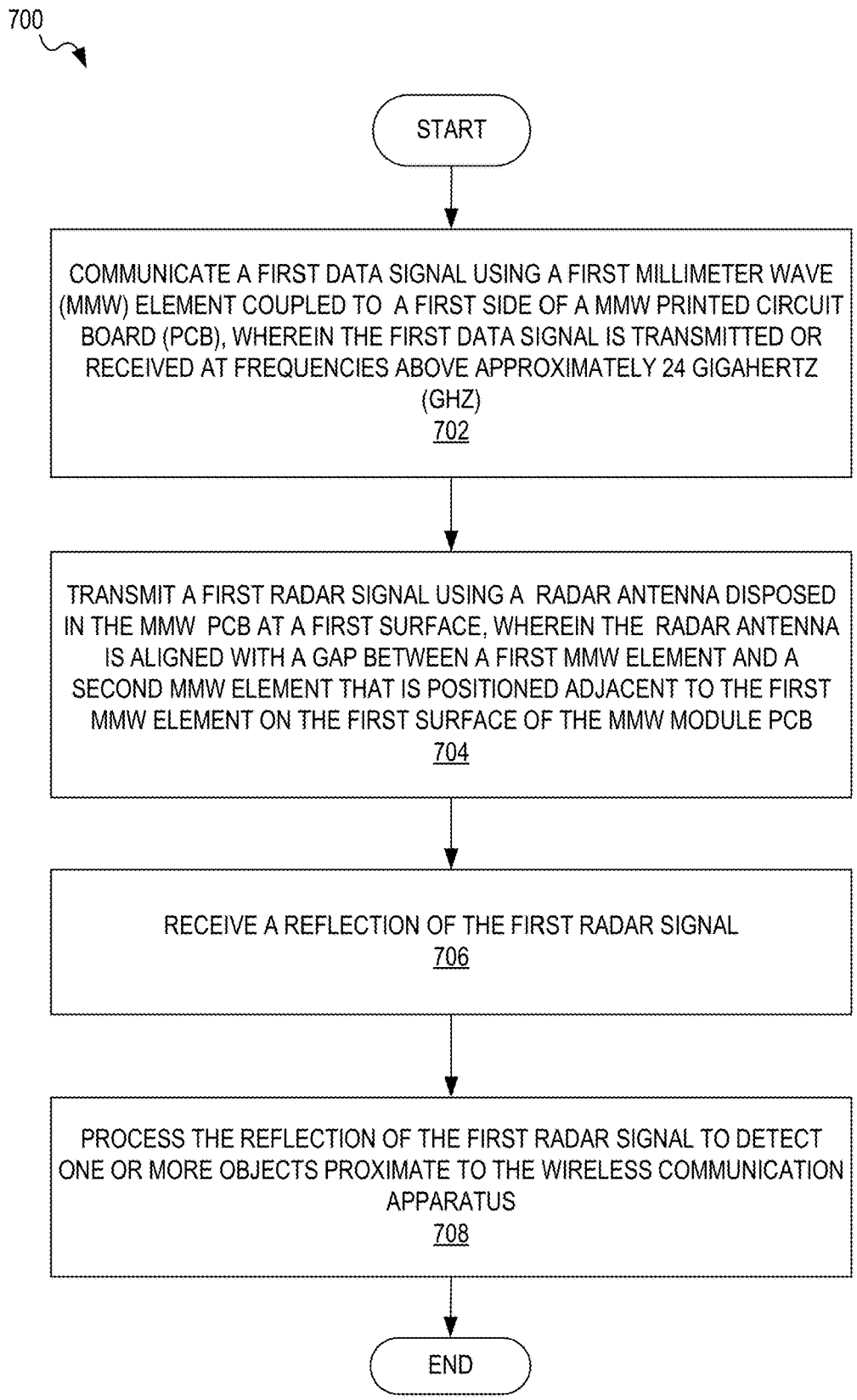
FIG. 7 is a flow diagram describing an example of the operation of a method for operation of a device including a mmW antenna array with integrated radar sensors in accordance with some aspects.

FIG. 7 is a flow diagram describing an example of the operation of a method for operation of a device including a mmW antenna array with integrated radar sensors in accordance with some aspects. The blocks in the method 700 can be performed in or out of the order shown, and in some embodiments, can be performed at least in part in parallel.

Method 700 includes block 702, which involves communicating a first data signal using a first millimeter wave (mmW) element coupled to a first side of a mmW PCB. In some aspects of such a method, the first data signal is transmitted or received at frequencies above approximately 24 gigahertz (GHz). In some aspects of block 702, the first data signal is communicated at FR2 frequencies between 24.25 GHz and 52.6 GHz.

Method 700 includes block 704, which involves transmitting a first radar signal (e.g., an FMCW radar signal)

using a radar antenna disposed in the mmW PCB at a first surface. In some aspects, the radar antenna is disposed in an integral layer of the mmW PCB. In some aspects of block 704, the radar antenna includes a stub and a slot disposed in a first metal layer above the slot. In some implementations, the first metal layer can be a ground plane. In some aspects, the slot is an hourglass shaped slot, and the stub and slot are communicatively coupled to communication circuitry via a stripline. In some aspects of block 704, the radar antenna is positioned in a gap between a first mmW element and a second mmW element, where the second mmW element is positioned adjacent to the first mmW element in or on the first surface of the mmW PCB. The gap may be referred to as an element gap, and may be defined by edges of each element that contact the mmW substrate, or boundaries created by vias that connect each mmW element to the mmW substrate. In some aspects of such a method, the elements are mounted to the mmW substrate by intermediate element substrates, and vias through the intermediate substrates electrically couple the mmW elements to the mmW substrate. In some aspects of such a method, an additional substrate gap is associated with such vias, where the radar antenna may be disposed between the substrate gap, or under the substrates along or near the substrate gap. In other aspects, rather than being positioned at the element gap or a substrate gap, the antenna may be positioned at an edge of the mmW substrate, either at an edge of a mmW element, near a gap between one or more elements at the mmW substrate edge, or running along a mmW substrate edge past multiple mmW elements. In some aspects of such a method, the data signal is the radar antenna is configured for operation at frequencies between approximately 57 GHz and 71 GHz. In some aspects of method 700, the radar antenna is configured for operation at frequencies of approximately 26 GHz Method 700 includes block 706, which involves receiving a reflection of the first radar signal. The reflection can include data about surrounding objects, including data captured over time indicating changes in position, data about vital or biometrics of a person near the mmW module, or other such data.

Method 700 includes block 708, which involves processing the reflection of the first radar signal to detect one or more objects proximate to the wireless communication apparatus. Such detection is made from the data in the reflection signal described above.

In some aspects, such methods can further include operations to determine a signal power associated with the first data signal over a time period; monitoring the reflection of the first radar signal over the time period; and estimate an electromagnetic power exposure for the one or more objects over the time period using the signal power and the reflection of the first radar signal over the time period. In other aspects, such methods can use signals from multiple transmission elements, or can process data from multiple radar antennas receiving reflection signals from the same sources.

Figure 8:
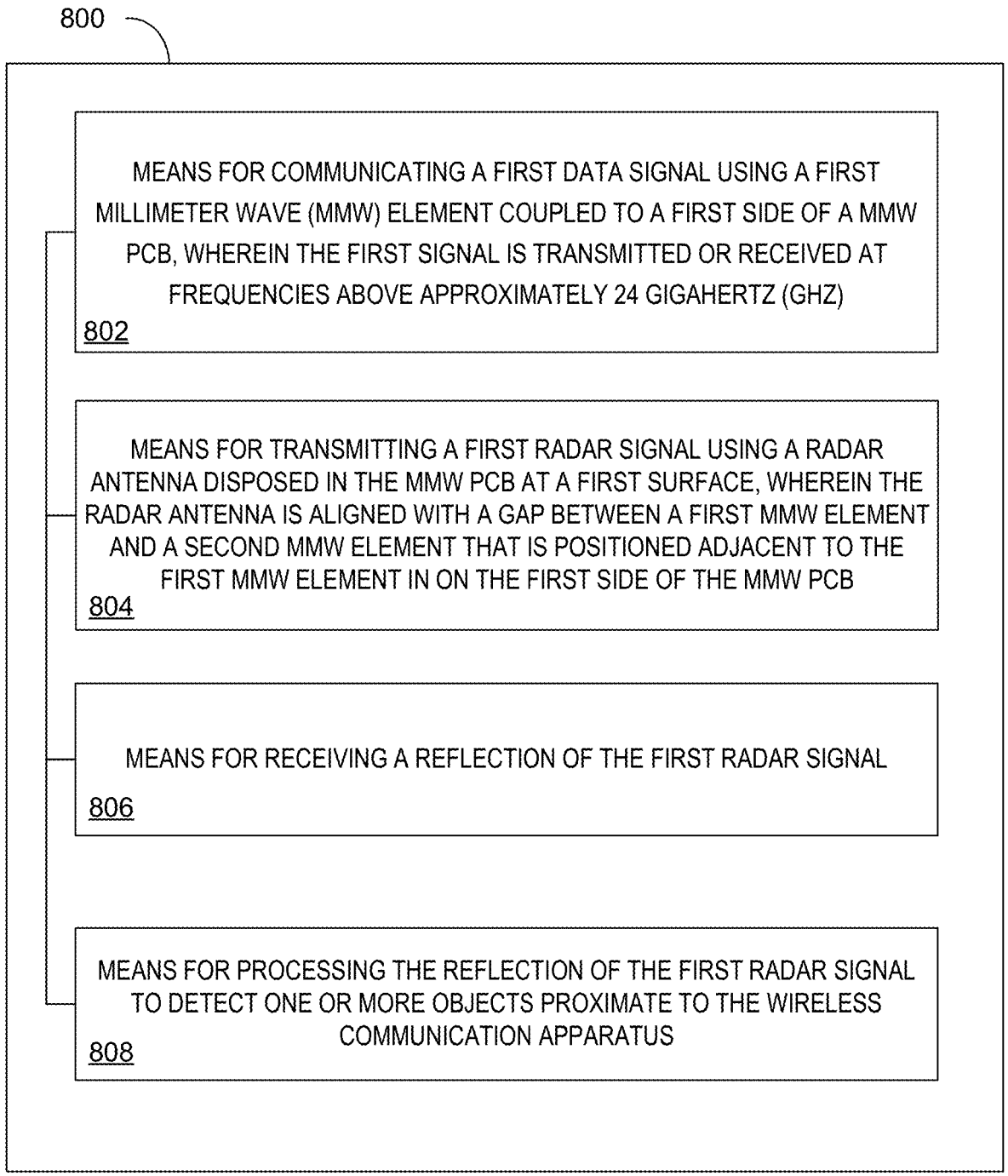
FIG. 8 is a functional block diagram of an apparatus including a mmW antenna array and integrated radar sensors in accordance with some aspects.

FIG. 8 is a functional block diagram of an apparatus including a mmW antenna array and integrated radar sensors in accordance with some aspects. The apparatus 800 comprises means 802 for communicating a first data signal using a first millimeter wave (mmW) element coupled to a first side of a mmW PCB, wherein the first data signal is transmitted or received at frequencies above approximately 24 gigahertz (GHz). The apparatus 800 comprises means 804 for transmitting a first radar signal using a radar antenna disposed in the mmW PCB at a first surface, where the radar antenna is aligned with a gap between a first mmW element and a second mmW element that is positioned adjacent to the first mmW element in or on the first surface of the mmW PCB. The apparatus 800 comprises means 806 for receiving a reflection of the first radar signal. The apparatus 800 comprises means 808 for processing the reflection of the first radar signal to detect one or more objects proximate to the wireless communication apparatus. In some implementations, the apparatus 800 may further include second means for receiving the reflection of the first radar signal oriented in different position on a substrate of the wireless communication apparatus than the means for receiving the reflection. In other implementations, other elements may be present, including duplicate elements.

Some implementations comprises means for transmitting or receiving mmW signals. Such means can include any description herein, including the mmW IC 1010 and mmW antennas of FIGS. 2A-C. Some implementations further include means for generating radar signals and receiving radar signal reflections. The means can include radar antennas or sensors in any configuration described herein, including the configurations between mmW elements and along mmW substrate edges.

Devices, networks, systems, and certain means for transmitting or receiving signals described herein may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles, and will be referred to herein as "sub-7 GHz". A similar nomenclature issue sometimes occurs with regard to FR2, which is often referred to (interchangeably) as a "millimeter wave" (mmW) band in documents and articles, despite including frequencies outside of the extremely high frequency (EHF) band (30 GHz-300 GHz) which is identified by the International Telecommunications Union (ITU) as a "mmWave" or mmW band. Unless specifically stated otherwise, it should be understood that the term "mmWave", mmW, or the like if used herein may broadly represent frequencies that may include mid-band frequencies, may be within FR2, or may be within the EHF band.

The circuit architecture described herein described herein may be implemented on one or more ICs, analog ICs, mmWICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR) or corresponding mmW elements, (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

Illustrative aspects of the present disclosure include, but are not limited to:

Aspect 1: A millimeter wave (mmW) module printed circuit board (PCB); a first mmW element coupled to a first side of the mmW PCB, wherein the first mmW element is configured for wireless mmW communications at frequencies above approximately 24 gigahertz (GHz); a second mmW element coupled to the first side of the mmW PCB, wherein the second mmW element is positioned adjacent to the first mmW element and is separated from the first mmW element by a gap spacing; and a radar antenna disposed in the mmW PCB and aligned with the gap spacing between the first mmW element and the second mmW element.

Aspect 2: The wireless communication apparatus of aspect 1, wherein the radar antenna comprises a slot antenna configured for frequency modulated continuous wave (FMCW) radar operation.

Aspect 3: The wireless communication apparatus of aspect 2, wherein the slot antenna comprises an hourglass-shaped slot disposed in a first metal layer of the mmW PCB, and an antenna stub positioned along a center portion of the hourglass-shaped slot.

Aspect 4: The wireless communication apparatus of aspect 3, wherein the slot antenna further comprises a stripline feed coupled to a center portion of the antenna stub, wherein the stripline feed is configured to provide a radar signal to the antenna stub and the hourglass-shaped slot or to receive a reflected radar signal from the antenna stub and the hourglass-shaped slot.

Aspect 5: The wireless communication apparatus of any of aspects 1 through 4, wherein the first mmW element and the second mmW element are implemented in the mmW PCB; and wherein the gap spacing is a gap of approximately 1 millimeter (mm) between the first mmW element and the second mmW element.

Aspect 6: The wireless communication apparatus of any of aspects 1 through 5, further comprising: a third mmW element coupled to the first side of the mmW PCB, wherein the third mmW element is configured for wireless mmW communications at frequencies above approximately 24 gigahertz (GHz); a fourth mmW element coupled to the first side of the mmW PCB, wherein the fourth mmW element is positioned adjacent to the third mmW element separated from the third mmW element by a second gap spacing; and a second radar antenna disposed in the mmW PCB at the first surface in the second gap spacing between the third mmW element and the fourth mmW element.

Aspect 7: The wireless communication apparatus of aspect 6, wherein the radar antenna is coupled to radar control circuitry via a first stripline configured to provide a radar signal to the radar antenna; and wherein the second radar antenna is coupled to the radar control circuitry via a second stripline configured to receive reflections of the radar signal from the second radar antenna.

Aspect 8: The wireless communication apparatus of aspect 6, wherein the radar antenna is coupled to radar control circuitry via a first stripline configured to provide a radar signal to the radar antenna and to receive reflections of the radar signal from the second radar antenna.

Aspect 9: The wireless communication apparatus of aspect 6, wherein the radar antenna and the second radar antenna are oriented in mutually orthogonal orientations.

Aspect 10: The wireless communication apparatus of aspect 6, wherein the radar antenna is aligned along a gap associated with the gap spacing; and wherein the second radar antenna is aligned across a second gap associated with the second gap spacing.

Aspect 11: The wireless communication apparatus of aspect 6, wherein the radar antenna is positioned diagonally across a gap associated with the gap spacing; and wherein the second radar antenna is positioned diagonally across a second gap associated with the second gap spacing.

Aspect 12: The wireless communication apparatus of aspect 6, wherein the radar antenna is positioned along a gap length associated with the gap spacing between the first mmW element and the second mmW element.

Aspect 13: The wireless communication apparatus of any of aspects 1 through 12, wherein the radar antenna is configured for operation at frequencies between approximately 57 GHz and 71 GHz.

Aspect 14: The wireless communication apparatus of any of aspects 1 through 12, wherein the radar antenna is configured for operation at frequencies of approximately 26 GHz.

Aspect 15: The wireless communication apparatus of any of aspects 1 through 14, wherein the first mmW element comprises a mmW antenna configured to transmit or receive the wireless mmW communications.

Aspect 16: The wireless communication apparatus of any of aspects 1 through 15, wherein the mmW antenna is configured to avoid interference with the radar antenna.

Aspect 17: The wireless communication apparatus of any of aspects 1 through 16, further comprising: a display screen; and control circuitry coupled to the display screen, the first mmW element, and the radar antenna.

Aspect 18: The wireless communication apparatus of any of aspects 1 through 17, wherein the first mmW element is implemented in a first antenna element PCB coupled to the first side of the mmW PCB; wherein the second mmW element is implemented in a second antenna element PCB coupled to the first side of the mmW PCB, the second antenna element PCB being separated from the first antenna element PCB by a substrate gap.

Aspect 19: The wireless communication apparatus of aspect 18, wherein the substrate gap is approximately 0.4 millimeters, and wherein the gap spacing is approximately 1.1 mm.

Aspect 20: The wireless communication apparatus of aspect 18, wherein the first element substrate and the second element substrate cover at least a portion of the radar antenna at the first side in the gap spacing.

Aspect 21: A method of operating a wireless communication apparatus, comprising: communicating a first data signal using a first millimeter wave (mmW) element coupled to a first side of a mmW PCB, wherein the first data signal is transmitted or received at frequencies above approximately 24 gigahertz (GHz); transmitting a radar signal using a radar antenna disposed in the mmW PCB at a first surface, wherein the radar antenna is positioned in a gap between a first mmW element and a second mmW element that is positioned adjacent to the first mmW element on the first surface of the mmW PCB; receiving a reflection of the first FMCW radar signal; and processing the reflection of the first FMCW radar signal to detect one or more objects proximate to the wireless communication apparatus.

Aspect 22: The method of aspect 21, further comprising: determining a signal power associated with the first data signal over a time period; monitoring the reflection of the first FMCW radar signal over the time period; and estimating an electromagnetic power exposure for the one or more objects over the time period using the signal power and the reflection of the first FMCW radar signal over the time period.

Aspect 23: The method of any of aspects 21 through 22, further comprising processing the reflection of the first FMCW radar signal to determine a human vital sign measurement.

Aspect 24: The method of any of aspects 21 through 23, wherein the radar antenna is configured for operation at frequencies between approximately 57 GHz and 71 GHz.

Aspect 25: The method of any of aspects 21 through 23, wherein the radar antenna is configured for operation at frequencies of approximately 26 GHz.

Aspect 26: A wireless communication apparatus, comprising: means for communicating a first data signal using a first millimeter wave (mmW) element coupled to a first side of a mmW PCB, wherein the first data signal is transmitted or received at frequencies above approximately 24 gigahertz (GHz); means for transmitting a radar signal using a radar antenna disposed in the mmW PCB at a first surface, wherein the radar antenna is positioned in a gap between a first mmW element and a second mmW element that is positioned adjacent to the first mmW element on the first surface of the mmW PCB; means for receiving a reflection of the first FMCW radar signal; and means for processing the reflection of the first FMCW radar signal to detect one or more objects proximate to the wireless communication apparatus.

Aspect 27: The wireless communication apparatus of aspect 26, further comprising second means for receiving the reflection of the first FMCW radar signal oriented in different position on a substrate of the wireless communication apparatus than the means for receiving the reflection.

Aspect 28: A wireless communication apparatus, comprising: a millimeter wave (mmW) substrate; a first mmW element coupled to circuitry of the mmW module substrate, wherein the first mmW element is configured for wireless mmW communications at frequencies above approximately 24 gigahertz (GHz); a slot antenna disposed in a metal layer of the mmW PCB, the slot positioned adjacent to an element boundary for the first mmW element in the mmW module substrate.

Aspect 29: The wireless communication apparatus of aspect 28, wherein the slot antenna is positioned between the element boundary and an edge of the mmW substrate.

Aspect 30: The wireless communication apparatus of aspect 28, wherein the slot antenna is positioned between the element boundary and an element boundary for a second mmW element coupled to the mmW substrate at a position adjacent to the first mmW element, wherein the element boundary for each element is determined by an extent of associated patches and parasitics for each element.

What is claimed is:

1. A wireless communication apparatus, comprising:
   a millimeter wave (mmW) printed circuit board (PCB) disposed within the wireless communication apparatus;
   a first mmW element coupled to a first side of the mmW PCB, wherein the first mmW element is configured for wireless mmW communications with at least one other wireless communication device at frequencies above approximately 24 gigahertz (GHz);
   a second mmW element coupled to the first side of the mmW PCB, wherein the second mmW element is positioned adjacent to the first mmW element and is separated from the first mmW element by a gap spacing; and
   a radar antenna disposed in the mmW PCB and aligned with the gap spacing between the first mmW element and the second mmW element.

2. The wireless communication apparatus of claim 1, wherein the radar antenna comprises a slot antenna configured for frequency modulated continuous wave (FMCW) radar operation.

3. The wireless communication apparatus of claim 2, wherein the slot antenna comprises an hourglass-shaped slot disposed in a first metal layer of the mmW PCB, and an antenna stub positioned along a center portion of the hourglass-shaped slot.

4. The wireless communication apparatus of claim 3, wherein the slot antenna further comprises a stripline feed coupled to a center portion of the antenna stub, wherein the stripline feed is configured to provide a radar signal to the antenna stub and the hourglass-shaped slot or to receive a reflected radar signal from the antenna stub and the hourglass-shaped slot.

5. The wireless communication apparatus of claim 1, wherein the first mmW element and the second mmW element are implemented in the mmW PCB; and
   wherein the gap spacing is a gap of approximately 1 millimeter (mm) between the first mmW element and the second mmW element.

6. The wireless communication apparatus of claim 1, further comprising:
   a third mmW element coupled to the first side of the mmW PCB, wherein the third mmW element is configured for wireless mmW communications at frequencies above approximately 24 gigahertz (GHz);
   a fourth mmW element coupled to the first side of the mmW PCB, wherein the fourth mmW element is positioned adjacent to the third mmW element separated from the third mm W element by a second gap spacing; and
   a second radar antenna disposed in the mmW PCB and aligned with the second gap spacing between the third mmW element and the fourth mmW element.

7. The wireless communication apparatus of claim 6, wherein the radar antenna is coupled to radar control circuitry via a first stripline configured to provide a radar signal to the radar antenna; and
   wherein the second radar antenna is coupled to the radar control circuitry via a second stripline configured to receive reflections of the radar signal from the radar antenna.

8. The wireless communication apparatus of claim 6, wherein the radar antenna is coupled to radar control circuitry via a first stripline configured to provide a radar signal to the radar antenna and to receive reflections of the radar signal from the radar antenna.

9. The wireless communication apparatus of claim 8, wherein the radar antenna and the second radar antenna are oriented in mutually orthogonal orientations.

10. The wireless communication apparatus of claim 6, wherein the radar antenna is aligned along a gap associated with the gap spacing; and
    wherein the second radar antenna is aligned across a second gap associated with the second gap spacing.

11. The wireless communication apparatus of claim 6, wherein the radar antenna is positioned diagonally across a gap associated with the gap spacing; and
wherein the second radar antenna is positioned diagonally across a second gap associated with the second gap spacing.

12. The wireless communication apparatus of claim 6, wherein the radar antenna is positioned along a gap length associated with the gap spacing between the first mmW element and the second mmW element.

13. The wireless communication apparatus of claim 1, wherein the radar antenna is configured for operation at frequencies between approximately 57 GHz and 71 GHz.

14. The wireless communication apparatus of claim 1, wherein the radar antenna is configured for operation at frequencies of approximately 26 GHz.

15. The wireless communication apparatus of claim 1, wherein the first mmW element comprises a mmW antenna configured to transmit or receive the wireless mmW communications.

16. The wireless communication apparatus of claim 1, wherein the radar antenna is configured to avoid interference with the first mmW element and the second mmW element.

17. The wireless communication apparatus of claim 1, further comprising:
a display screen; and
control circuitry coupled to the display screen, the first mmW element, and the radar antenna.

18. The wireless communication apparatus of claim 1, wherein the first mmW element is implemented in a first antenna element PCB coupled to the first side of the mmW PCB;
wherein the second mmW element is implemented in a second antenna element PCB coupled to the first side of the mmW PCB, the second antenna element PCB being separated from the first antenna element PCB by a substrate gap.

19. The wireless communication apparatus of claim 18, wherein the substrate gap is approximately 0.4 millimeters, and wherein the gap spacing is approximately 1.1 mm.

20. The wireless communication apparatus of claim 18, wherein the first antenna element PCB or the second antenna element PCB cover at least a portion of the radar antenna at the first side in the gap spacing.

21. A method of operating a wireless communication apparatus, comprising:
communicating a first data signal using a first millimeter wave (mmW) element coupled to a first side of a mmW printed circuit board (PCB) disposed in the wireless communication apparatus, wherein the first data signal is transmitted to at least one other wireless communication device or received from at least one other wireless communication device at frequencies above approximately 24 gigahertz (GHz);
transmitting a first radar signal using a radar antenna disposed in the mmW PCB at a first surface, wherein the radar antenna is aligned with a gap between the first mmW element and a second mmW element that is positioned adjacent to the first mmW element on the first surface of the mmW PCB;
receiving a reflection of the first radar signal; and
processing the reflection of the first radar signal to detect one or more objects proximate to the wireless communication apparatus.

22. The method of claim 21, further comprising:
determining a signal power associated with the first data signal over a time period;
monitoring the reflection of the first radar signal over the time period; and
estimating an electromagnetic power exposure for the one or more objects over the time period using the signal power and the reflection of the first radar signal over the time period.

23. The method of claim 21, further comprising processing the reflection of the first radar signal to determine a human vital sign measurement.

24. The method of claim 21, wherein the radar antenna is configured for operation at frequencies between approximately 57 GHz and 71 GHz.

25. The method of claim 21, wherein the radar antenna is configured for operation at frequencies of approximately 26 GHz.

26. A wireless communication apparatus, comprising:
means disposed in the wireless communication apparatus for communicating a first data signal using a first millimeter wave (mmW) element coupled to a first side of a mmW printed circuit board (PCB), wherein the first data signal is transmitted to at least one other wireless communication device or received from at least one other wireless communication device at frequencies above approximately 24 gigahertz (GHz);
means for transmitting a first radar signal using a radar antenna disposed in the mmW PCB at a first surface, wherein the radar antenna is aligned with a gap between the first mmW element and a second mmW element that is positioned adjacent to the first mmW element on the first surface of the mmW PCB;
means for receiving a reflection of the first radar signal; and
means for processing the reflection of the first radar signal to detect one or more objects proximate to the wireless communication apparatus.

27. The wireless communication apparatus of claim 26, further comprising second means for receiving the reflection of the first radar signal oriented in different position on a substrate of the wireless communication apparatus than the means for receiving the reflection.

28. A wireless communication apparatus, comprising:
a millimeter wave (mmW) substrate disposed within the wireless communication apparatus;
a first mmW element coupled to the mmW substrate, wherein the first mmW element is configured for wireless mmW communications with at least one other wireless communication device at frequencies above approximately 24 gigahertz (GHz); and
a slot antenna comprising a slot disposed in a metal layer of the mmW substrate, the slot positioned adjacent to an element boundary for the first mmW element, where the element boundary is defined by metal layers of the first mmW element.

29. The wireless communication apparatus of claim 28, wherein the slot antenna is positioned between the element boundary and an edge of the mmW substrate.

30. The wireless communication apparatus of claim 28, wherein the slot antenna is positioned between the element boundary and an element boundary for a second mmW element coupled to the mmW substrate at a position adjacent to the first mmW element, wherein the element boundary for each element is determined by an extent of associated patches and parasitics for each element.

* * * * *